(12) United States Patent
Takayama et al.

(10) Patent No.: US 10,386,699 B2
(45) Date of Patent: Aug. 20, 2019

(54) SHUTTER APPARATUS AND IMAGE CAPTURING APPARATUS

(71) Applicant: CANON KABUSHIKI KAISHA, Tokyo (JP)

(72) Inventors: Masahiro Takayama, Tokyo (JP); Kazuya Karibe, Kawasaki (JP); Jumpei Ishibiki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/864,277

(22) Filed: Jan. 8, 2018

(65) Prior Publication Data

US 2018/0196333 A1  Jul. 12, 2018

(30) Foreign Application Priority Data

Jan. 10, 2017 (JP) .................................. 2017-001630
Nov. 22, 2017 (JP) .................................. 2017-224198

(51) Int. Cl.
*G03B 9/36* (2006.01)
*G03B 9/40* (2006.01)

(52) U.S. Cl.
CPC ........ *G03B 9/36* (2013.01); *G03B 9/40* (2013.01)

(58) Field of Classification Search
CPC .............. G03B 9/08; G03B 9/22; G03B 9/36
See application file for complete search history.

(56) References Cited

U.S. PATENT DOCUMENTS 9,829,769 B2 * 11/2017 Nishio ...................... G03B 9/36
2008/0151093 A1 * 6/2008 Wakikawa ............. H04N 5/232
348/333.01

FOREIGN PATENT DOCUMENTS

JP       H07-56211 A      3/1995

* cited by examiner

*Primary Examiner* — Clayton E. LaBalle
*Assistant Examiner* — Linda B Smith
(74) *Attorney, Agent, or Firm* — Carter, DeLuca & Farrell LLP

(57) ABSTRACT

A shutter apparatus includes a shutter base plate having an opening, a light shield movable between a closed state for closing the opening and an open state for opening the opening, a cam member rotatable in a first angle range, a second angle range, and a third angle range between the first angle range and the second angle range, the cam member that rotates in the third angle range rotating the light shield, a motor configured to drive the cam member, a forcing member configured to force the cam member so as to rotate the cam member from the first angle range to the third angle range, and a restricting member configured to restrict the forcing member from forcing the cam member in at least part of the first angle range.

12 Claims, 17 Drawing Sheets

SHUTTER APPARATUS AND IMAGE CAPTURING APPARATUS

BACKGROUND OF THE INVENTION

Field of the Invention

The present invention relates to a shutter apparatus that can be operated by a driving force of a motor.

Description of the Related Art

Japanese Patent Laid-Open No. ("JP") 7-56211 discloses a shutter apparatus that opens and closes an opening through shutter blades by rotating a driving ring through a stepping motor. This driving ring has an acceleration area in which the rotating shutter blades do not open and close the opening, and an exposure area in which the rotating shutter blades open and close the opening.

However, the shutter apparatus disclosed in JP 7-56211 cannot sufficiently accelerate the driving ring in the acceleration area depending on the output of the motor to be used and may not obtain a curtain speed necessary for a high shutter speed. This shutter apparatus can accelerate the curtain speed by assisting the drive ring through a spring in part of the acceleration area, but requires the spring to be charged for each release and causes a long release time lag. For a shorter release time lag, the spring needs to stand by or stop while being charged. Nevertheless, charging the spring on standby (stop) requires the motor to be electrified, causing a large power consumption amount.

SUMMARY OF THE INVENTION

This embodiment provides a shutter apparatus and an image capturing apparatus, which can restrain a power consumption amount with a shorter release time lag A shutter apparatus according to one aspect of the present invention includes a shutter base plate having an opening, a light shield movable between a closed state for closing the opening and an open state for opening the opening, a cam member rotatable in a first angle range, a second angle range, and a third angle range between the first angle range and the second angle range, the cam member that rotates in the third angle range rotating the light shield, a motor configured to drive the cam member, a forcing member configured to force the cam member so as to rotate the cam member from the first angle range to the third angle range, and a restricting member configured to restrict the forcing member from forcing the cam member in at least part of the first angle range.

Further features of the present invention will become apparent from the following description of exemplary embodiments with reference to the attached drawings.

DESCRIPTION OF THE EMBODIMENTS

A description will now be given of embodiments according to the present invention, with reference to the accompanying drawing.

First Embodiment

Figure 8:
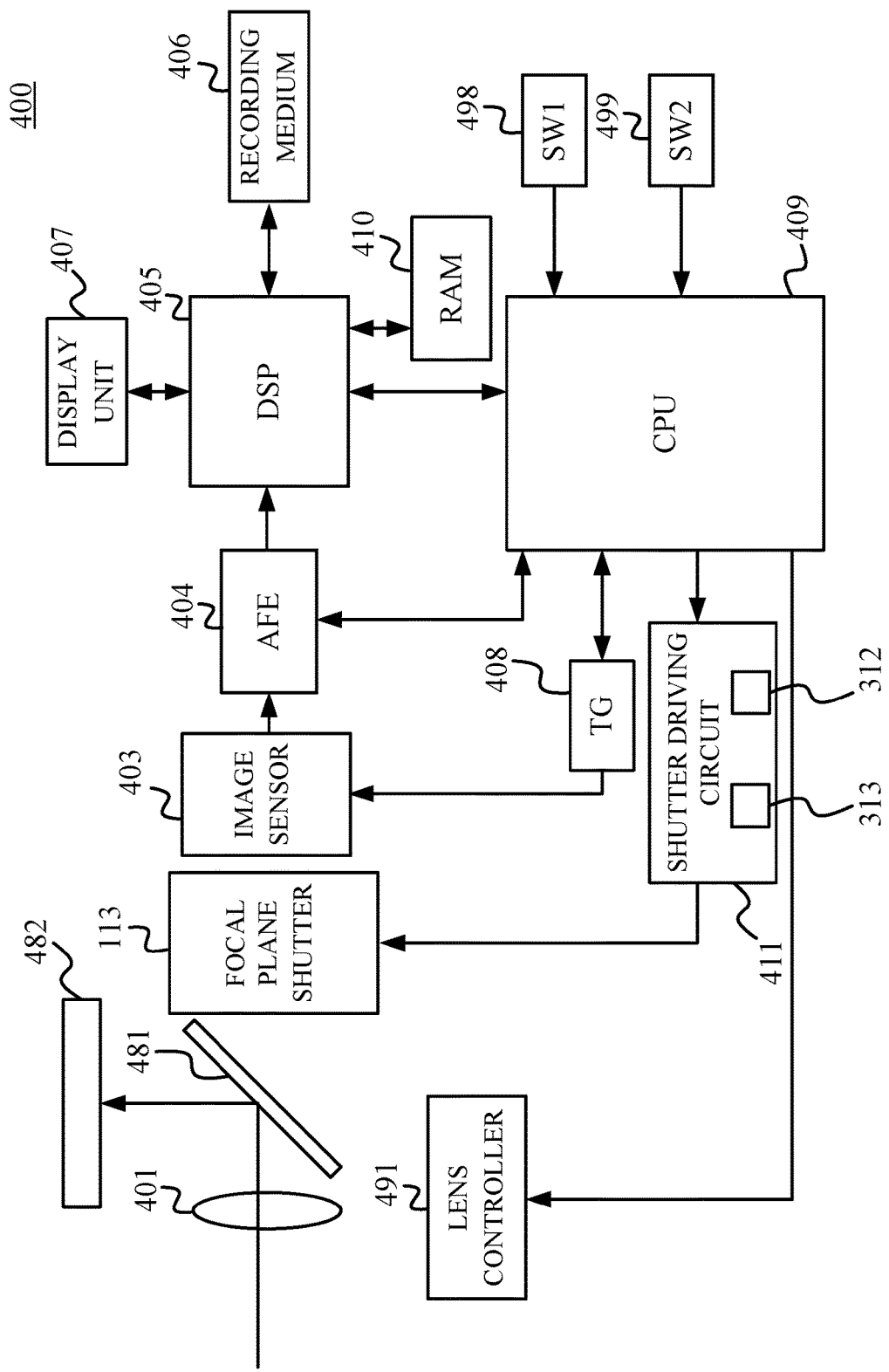
FIG. 8 is a block diagram of an image capturing apparatus according to the first embodiment.

Referring now to FIG. 8, a description will be given of an image capturing apparatus according to a first embodiment of the present invention. FIG. 8 is a block diagram of an image capturing apparatus 400. In FIG. 8, reference numeral 401 denotes an image capturing lens, reference numeral 113 denotes a focal plane shutter (shutter apparatus), reference numeral 403 denotes an image sensor, reference numeral 481 denotes a mirror member, and reference numeral 482 denotes a finder apparatus. When the image capturing apparatus 400 is in the finder observation state as illustrated in FIG. 8, part of a light flux in object light that has passed the image capturing lens 401 is reflected on the mirror member 481 located on the image capturing optical path, and guided to the finder apparatus 482. Thereby, the photographer can observe the object image via the finder apparatus 482. When the finder observation state turns into an image capturing state or a live-view state, the mirror member 481 is ejected (retreated) from the image capturing optical path by an unillustrated mirror-member driving unit. Thereby, the object light from the image capturing lens 401 moves to the image sensor 403.

The focal plane shutter 113 is disposed on the object side of the image sensor 403. Reference numeral 411 denotes a shutter driving circuit configured to drive the focal plane shutter 113. The focal plane shutter 113 has a plurality of blade units including a first blade unit 2 and a second blade unit 3 (see FIG. 1), and a CPU 409 (controller) controls its driving via the shutter driving circuit 411. The focal plane shutter 113 further includes motors 19 and 20 (see FIG. 1). The motors 19 and 20 rotate a first cam gear 15 and a second cam gear 16, and are controlled by a control circuit 312 and a driving circuit 313 included in the shutter driving circuit 411.

Reference numeral 498 is a switch (SW1) configured to start an image capturing preparation, and reference numeral 499 denotes a switch (SW2) configured to start image capturing. The switch (SW1) 498 and the switch (SW2) 499 form a two-stage switch, and the switch (SW1) 498 is turned on by the first stroke, and the switch (SW2) 499 is turned on by the second stroke.

The image sensor 403 has a CMOS image sensor etc., photoelectrically converts an object image (optical image) formed by the image capturing lens 401 (image capturing optical system), and outputs image data (analog image signal). An AFE (analog front end) 404 converts the analog image signal output from the image sensor 403 into a digital image signal. A DSP (digital signal processor) 405 performs a variety of image processing and compression/decompression processing for the digital image signal output from the AFE 404, and outputs processed image data.

A recording medium 406 stores the image data processed by the DSP 405. A display unit 407 includes a liquid crystal display (LCD), and displays a captured image and a variety of menu screens. A TG (timing generator) 408 controls driving of the image sensor 403. A RAM 410 is connected to the DSP 405 and temporarily stores image data etc.

A lens controller 491 outputs to the CPU 409 lens information, such as a focal length, an F-number, and an exit pupil diameter of the image capturing lens 401, and a distance between the exit pupil and the image sensor 403. The lens controller 491 drives a diaphragm (aperture stop), the lens etc. in the image capturing lens 401 under control of the CPU 409 (controller). A detection result of each detector contained in the lens controller 491 is input to the CPU 409. The CPU 409 controls the AFE 404, the DSP 405, the TG 408, the shutter driving circuit 411, and the lens controller 491.

Figure 1:
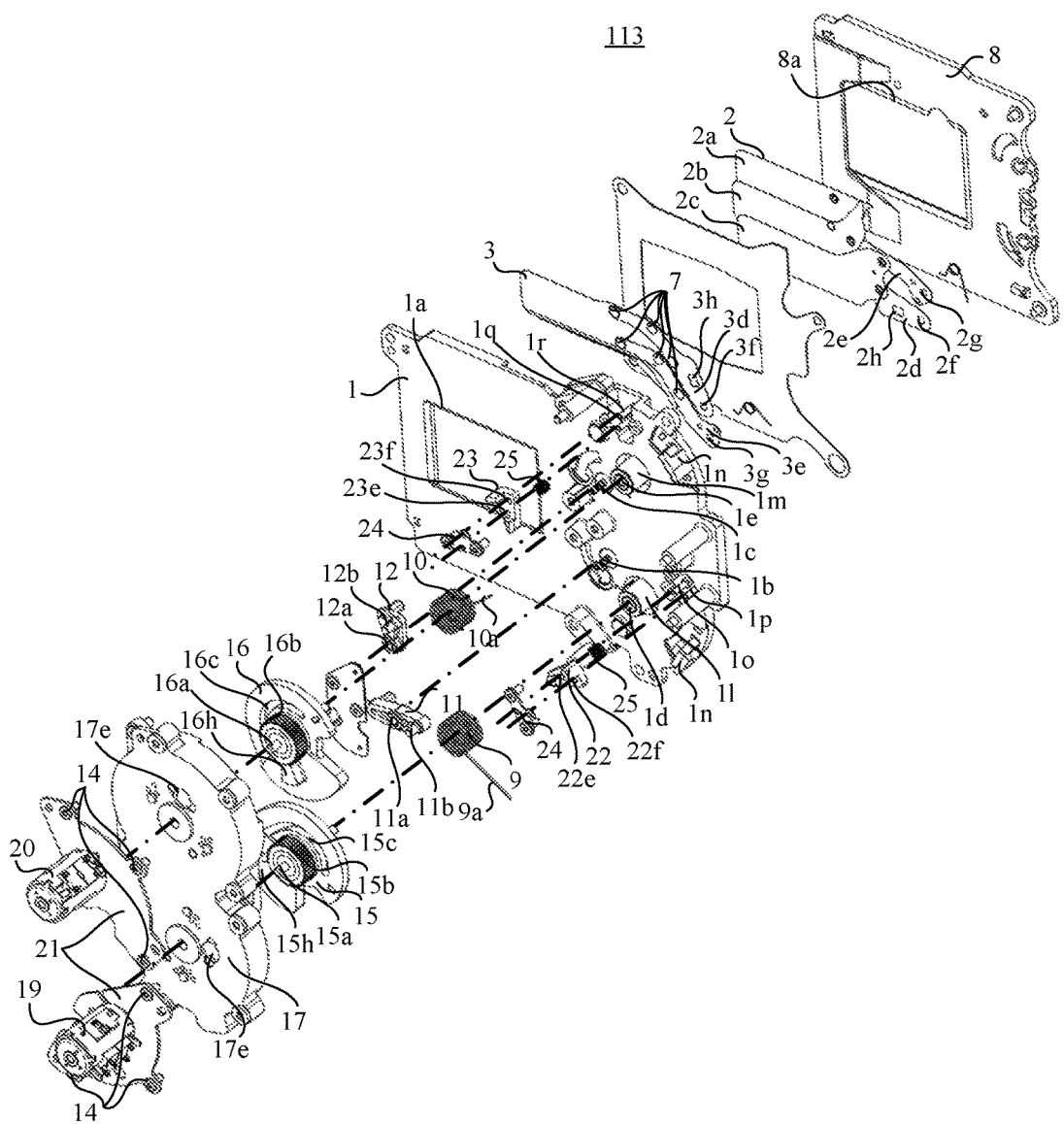
FIG. 1 is an exploded perspective view of a shutter apparatus according to a first embodiment viewed from an object side.
Figure 2:
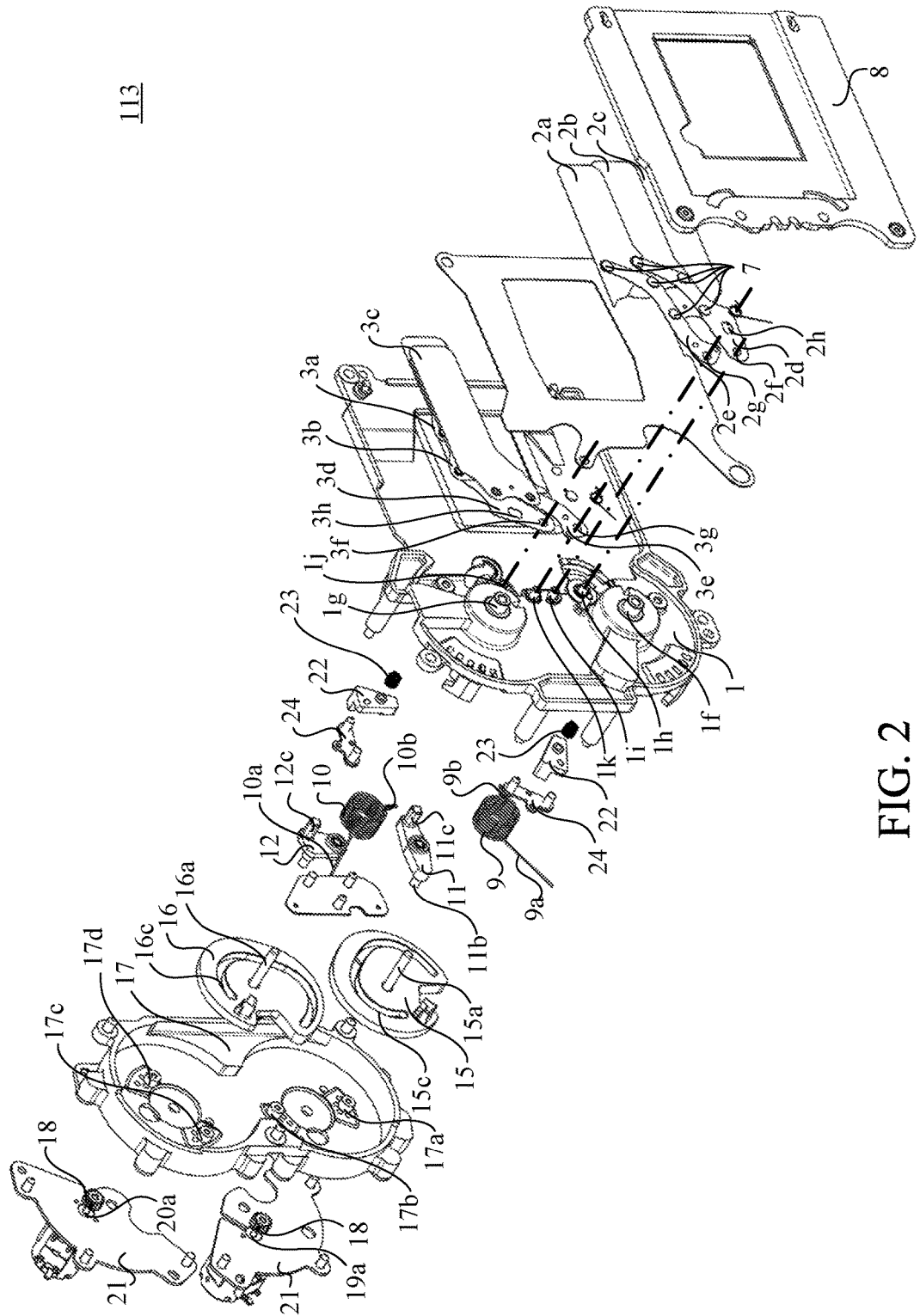
FIG. 2 is an exploded perspective view of the shutter apparatus according to the first embodiment viewed from an image sensor side.

Referring now to FIGS. 1 and 2, a description will be given of the configuration of the focal plane shutter (shutter apparatus) 113. FIG. 1 is an exploded perspective view of the focal plane shutter 113 viewed from the object side. FIG. 2 is an exploded perspective view of the focal plane shutter 113 viewed from the image sensor 403 side (image plane side).

A cover plate 8 is attached to a shutter base plate 1 on the image sensor 403 side (image plane side). A first blade unit 2 that includes blades 2a, 2b, and 2c, and blade arms 2d and 2e, and a second blade unit 3 that includes blades 3a, 3b, and 3c, and blade arms 3d and 3e are provided between the shutter base plate 1 and the cover plate 8. The shutter base plate 1 and the cover plate 8 have apertures 1a and 8a (openings). Each of the first blade unit 2 and the second blade unit 3 is a light shield movable between a closed state for closing the aperture 1a and an open state for opening the aperture 1a. Shafts 1b and 1c are provided on the shutter base plate 1 on the object side, a first drive member 11 is attached to the shaft 1b, and a second drive member 12 is attached to the shaft 1c.

Bearings 1d, 1e, 1f, and 1g are provided on the shutter base plate 1. A shaft 15a in the first cam gear 15 is engaged with the bearings 1d and 1f, and a shaft 16a in the second gear 16 is engaged with the bearings 1e and 1g. Each shaft is rotatably supported. Shafts 1h, 1i, 1j, and 1k are provided on the shutter base plate 1 on the image sensor 403 side, the first blade unit 2 is engaged rotatably with the shafts 1h and 1i, and the second blade unit 3 is engaged rotatably with the shafts 1j and 1k.

The shaft 1b in the shutter base plate 1 is engaged with a hole 11a in the first drive member 11, and the first drive member 11 is rotatable. A cam engagement pin 11b in the first drive member 11 is slidably engaged with a cam groove 15c in the first cam gear 15, and the cam engagement pin 11b drives the first drive member 11 along a cam groove 15c as the first cam gear 15 rotates. The shaft 1c on the shutter base plate 1 is inserted into a hole 12c in the second drive member 12, and the second drive member 12 is rotatable. A cam engagement pin 12b on the second drive member 12 is slidably engaged with a cam groove 16c in the second cam gear 16, and the cam engagement pin 12b drives the second drive member 12 along the cam groove 16c as the second cam gear 16 rotates.

The first blade unit 2 has two blade arms 2d and 2e and the three blades 2a, 2b, and 2c. Holes 2f and 2g in the two blade arms 2d and 2e are rotatably engaged with the shafts 1h and 1i of the shutter base plate 1 on the image sensor 403 side. The three blades 2a, 2b, and 2c are supported via connecting shafts 7 on the blade arms 2d and 2e. The blade arm 2 has a hole 2h, and a drive pin 11c on the first drive member 11 is engaged with the hole 2h. The first blade unit 2 is movable between a closed state in which the blades 2a, 2b, and 2c cover the aperture 1a in the shutter base plate 1, and an open state in which the blades 2a, 2b, and 2c retreat from the aperture 1a, as the first drive member 11 rotates.

The second blade unit 3 has two blade arms 3d and 3e and the three blades 3a, 3b, and 3c. Holes 3f and 3g in the two blade arms 3d and 3e are rotatably engaged with the shafts 1j and 1k of the shutter base plate 1 on the image sensor 403 side. The three blades 3a, 3b, and 3c are supported on the blade arms 3d and 3e via the connecting shafts 7. The blade arm 3 has a hole 3h, and a drive pin 12c on the second drive member 12 is engaged with the hole 3h. The second blade unit 3 is movable between a closed state in which the blades 3a, 3b, and 3c cover the aperture 1a in the shutter base plate 1, and an open state in which the blades 3a, 3b, and 3c retreat from the aperture 1a, as the second drive member 12 rotates.

An inner diameter part in the first assist spring 9 (forcing or urging member) is guided by the shaft 11 on the shutter base plate 1, and an inner diameter part in the second assist spring 10 (forcing or urging member) is guided by the shaft 1m on the shutter base plate 1. Arms 9a and 10a in the first assist spring 9 and the second assist spring 10 are engaged with an engagement part 1n, and arms 9b and 10b are engaged with the shutter base plate 1. The arms 9b and 10b are charged so as to generate forces in a right rotating direction when viewed from the object side.

Shafts 1o, 1p, 1q, and 1r are provided on the shutter base plate 1. The shafts 1o and 1p are engaged with holes 22e and 22f in a first assist spring restricting member 22 (restricting member), and shafts 1q and 1r are engaged with holes 23e and 23f in a second assist spring restricting member 23 (restricting member). The first and second assist spring restricting members 22 and 23 are guided by the shafts 1o, 1p, 1q, and 1r, and can move toward the image sensor 403 in a range restricted by the cover 24 and the shutter base plate 1. The inner diameter part of the compression spring 25 is guided and attached to the shaft 1o and 1q, and the assist spring restricting member 22 is forced towards the object.

Figure 3:
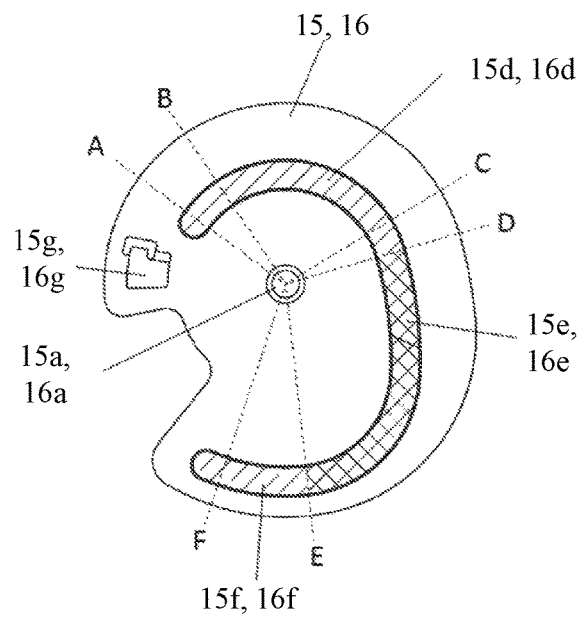
FIG. 3 is a front view of a cam gear in the shutter apparatus according to the first embodiment viewed from the image sensor side.

Referring now to FIG. 3, a description will be given of configurations of the first cam gear 15 and the second cam gear 16 (cam members). FIG. 3 is a front view of the first cam gear 15 and the second cam gear 16 viewed from the image sensor 403 side. Since the first cam gear 15 and the second cam gear 16 have shapes identical to each other, the reference numerals of corresponding elements are adjacently illustrated in FIG. 3.

The cam groove 15c in the first cam gear 15 (cam member) has a first idle running drive cam area 15d (first angle range), a second idle running drive cam area 15f (second angle range), and a blade drive cam area 15e (third angle rang). The first idle running drive cam area 15d is formed concentrically to the cam gear shaft 15a, and configured to hold the first blade unit 2 in an unfolded state via the cam engagement pin 11b. The second idle running drive cam area 15f is formed concentrically to the cam gear shaft 15a, and configured to hold the first blade unit 2 in a folded state via the cam engagement pin 11b. The blade drive cam area 15e is formed so as to connect the first idle running drive cam area 15d and the second idle running drive cam area 15f to each other, to drive the first blade unit 2 via the cam engagement pin 11b, and to transfer the aperture 1a to the closed or open state.

A cam groove 16c in the second cam gear 16 (cam member) 16 has a first idle running drive cam area 16d (first angle range), a second idle running drive cam area 16f (second angle range), and a blade drive cam area 16e (third angle rang). The first idle running drive cam area 16d is formed concentrically to the cam gear shaft 16a, and configured to hold the second blade unit 3 in a folded state via the cam engagement pin 12b. The second idle running drive cam area 16f is formed concentrically to the cam gear shaft 16a, and configured to hold the second blade unit 3 in an unfolded state via the cam engagement pin 12b. The blade drive cam area 16e is formed so as to connect the first idle running drive cam area 16d and the second idle running drive cam area 16f to each other, to drive the second blade unit 3 via the cam engagement pin 12b, and transfer the aperture 1a to the closed or open state.

Thus, each of the first cam gear 15 and the second cam gear 16 is rotatable in the first angle range (from the state A to the state D), in a second angle range (from the state D to the state E), and in a third angle range (from the state E to the state F) between the first angle range and the second angle range. Each of the first cam gear 15 and the second cam gear 16 moves a corresponding one of the first blade unit 2 and the second blade unit 3 when it rotates in the third angle range. In other words, each of the first cam gear 15 and the second cam gear 16 rotates in the first angle range and the second angle range without moving the corresponding one of the first blade unit 2 and the second blade unit 3. On the other hand, each of the first cam gear 15 and the second cam gear 16 rotates in the third angle state so as to move the corresponding one of the first blade unit 2 and the second blade unit 3.

As described later, the first assist spring 9 and the second assist spring 10 force the first cam gear 15 and the second cam gear 16 so as to rotate them from the first angle state to the third angle state. As described later, the assist spring restricting members 22 and 23 restrict the forces from the first assist spring 9 and the second assist spring 10 to the first cam gear 15 and the second cam gear 16 at least part of the first angle state (from the state A to the state B).

As illustrated in FIG. 1, motors 19 and 20 are attached to motor plates 21. The motor plates 21 are fixed onto a holder member 17 via screws 14. In addition, a pinion gear 18 is attached to each of output shafts 19a and 20a in the motors 19 and 20. The pinion gears 18 perforate holes 17e in the holder member 17, and are engaged with gear parts 15b and 16b in the first cam gear 15 and the second cam gear 16, and transmit the torques from the motors 19 and 20 to the first cam gear 15 and the second cam gear 16. Each of the motors 19 and 20 is a stepping motor configured to switch the electrification state of the coil according to the predetermined time interval.

Figure 4:
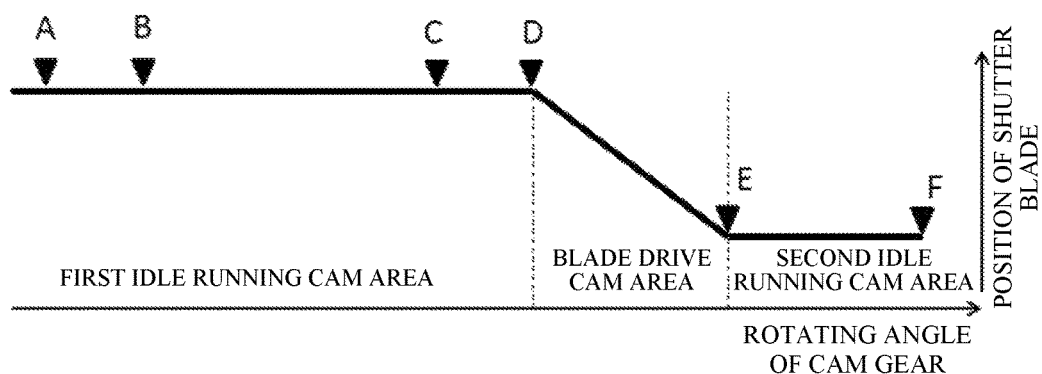
FIG. 4 illustrates a relationship between a rotating angle of the cam gear and a position of the shutter blade in the shutter apparatus according to the first embodiment.

Referring now to FIGS. 4 and 5A to 5G, a description will be given of the operation of the focal plane shutter 113 (shutter apparatus). FIG. 4 illustrates a relationship between the position of the blade unit (shutter blade) in the focal plane shutter 113 and the rotating angles of the first cam gear 15 and the second cam gear 16. States A to F illustrated in FIG. 4 correspond to the states A to F illustrated in FIG. 3. FIG. 3 illustrates positions at which the cam engagement pins 11b and 12b in the first drive member 11 and the second drive member 12 are engaged with the cam grooves 15c and 16c at the rotating angles of the first cam gear 15 and the second cam gear 16 corresponding to the states A to F illustrated in FIG. 4.

FIGS. 5A to 5G are schematic views illustrating a relationship among the first cam gear 15 and the second cam gear 16, the first assist spring 9 and the second assist spring 10, and the assist spring restricting members 22 and 23. Each figure is a plane (or sectional) view of the first cam gear 15 and the second cam gear 16 viewed from the radius direction. The right movements of the first cam gear 15 and the second cam gear 16 in each figure indicate left rotations of the first cam gear 15 and the second cam gear 16 viewed from the object side. On the other hand, the left movements of the first cam gear 15 and the second cam gear 16 in each figure indicates the right rotations of the first cam gear 15 and the second cam gear 16 viewed from the object side. In each figure, the upward direction is a direction toward the object, and the downward direction is a direction toward the image sensor 403. In FIGS. 5A to 5G, the first cam gear 15, the first assist spring 9, and the assist spring restricting member 22, have operations and arrangement similar to those of the second cam gear 16, the second assist spring 10, and the assist spring restricting member 23. Therefore, these reference numerals are collectively illustrated in each figure.

<Image Capturing Standby State (Spring Lock State)>

Figure 6:
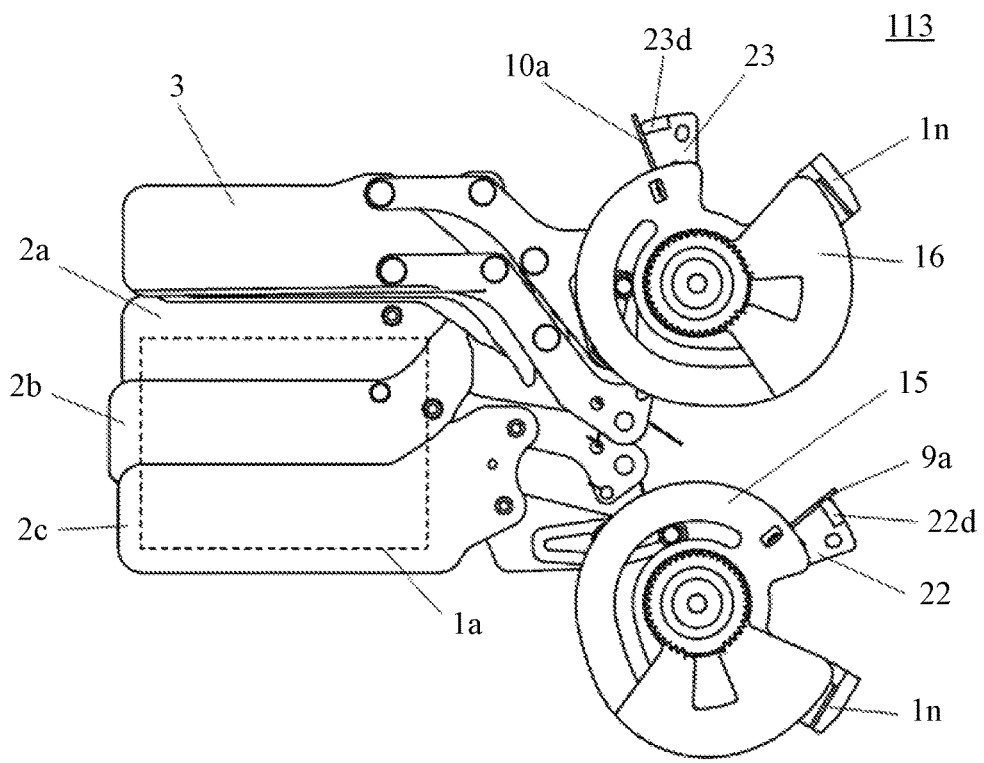
FIG. 6 illustrates a standby state before image capturing in the shutter apparatus according to the first embodiment.

FIG. 6 illustrates a standby state before image capturing (image capturing standby state) of the focal plane shutter 113. In the image capturing standby state, each of the first cam gear 15 and the second cam gear 16 has an angle in the state A illustrated in FIGS. 3 and 4. At this time, as illustrated in FIG. 6, the first blade unit 2 is unfolded and the second blade unit 3 is folded. The aperture 1a is closed by the blades 2a, 2b, and 2c.

As illustrated in FIG. 6, spring contact parts 22d and 23d in the assist spring restricting members 22 and 23 are located outside of the outer diameters of the first cam gear 15 and the second cam gear 16. Hence, the assist spring restricting members 22 and 23 and the cam gears 15 and 16 interfere with each other between the cam surfaces on which the assist spring restricting members 22 and 23 and pressing parts 15g and 16g provided to the cam gear 15 and 16. In this embodiment, the assist spring restricting members 22 and 23 are provided on first cam surfaces 22a and 23a, second cam surfaces 22b and 23b, and third cam surfaces 22c and 23c.

Figure 5A:
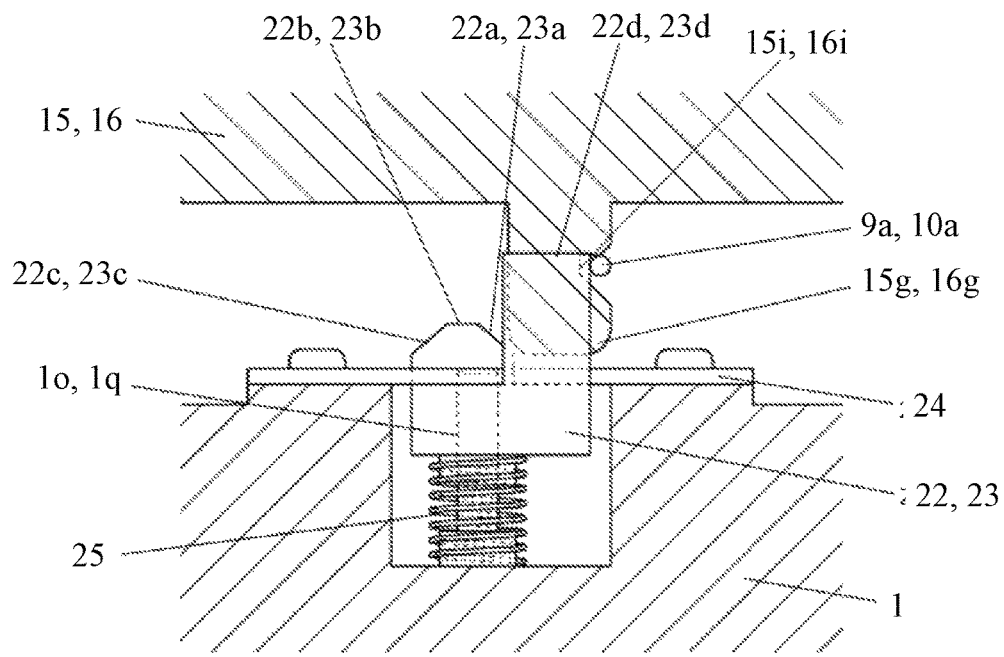
FIG. 5A is a schematic section of the relationship among the cam gear, an assist spring, and a spring restricting member in the shutter apparatus according to the first embodiment viewed from a radial direction of the cam gear.

FIG. 5A is a schematic view where the first cam gear 15 and the second cam gear 16 have the angles in the state A. As illustrated in FIG. 5A, the assist spring restricting members 22 and 23 are forced by a compression spring 25 in the upward direction (object direction or on object side) in FIG. 5A. Due to this configuration, the positions of the assist spring restricting members 22 and 23 in the upward direction in FIG. 5A are restricted and determined by the cover 24. The contact parts 22d and 23d in the assist spring restricting members 22 and 23 contact the assist spring arms 9a and 10a on the loci of respective assist springs. In this state, the spring contact parts 22d and 23d receive the left force in FIG. 5A (or right rotating force in FIG. 6) from the first assist spring 9 and the second assist spring 10.

The assist spring restricting members 22 and are engaged with the shafts 1o and 1q and the unillustrated shafts 1p and 1r, and movable in the downward direction (image sensor 403 direction or on the image plane side) in FIG. 5A. Hence, the first assist spring 9 and the second assist spring 10 stop in the charged states. In other words, in at least part of the first angle range (or in the state A or image capturing standby state), the assist spring restricting members 22 and 23 charge the assist springs and restrict the forces applied to the first cam gear 15 and the second cam gear 16, and the motors 19 and 20 stop. The first cam gear 15 and the second cam gear 16 do not receive leftward forces in FIG. 5A (right rotating forces in FIG. 6). Therefore, they can be stopped by the cogging torques by the motors 19 and 20, and the angles in the state A can be maintained and stood by without electrifying the motors 19 and 20. In this image capturing standby state, the focal plane shutter 113 waits for the switch (SW1) 498 to turn on. When the switch (SW1) 498 turns on in the image capturing apparatus 400 (see FIG. 8), an unillustrated distance measuring unit measures a distance to the object, and the lens controller 491 performs an image capturing preparation, such as focusing by driving the image capturing lens 401.

<Spring Unlock>

Figure 5B:
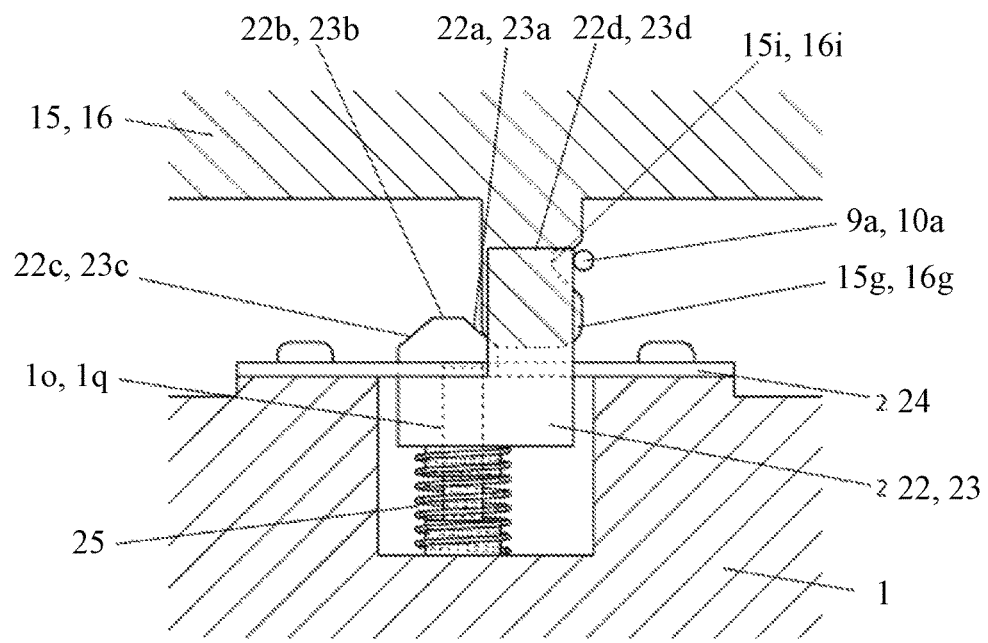
FIG. 5B is a schematic section of the relationship among the cam gear, the assist spring, and the spring restricting member in the shutter apparatus according to the first embodiment viewed from the radial direction of the cam gear.
Figure 5C:
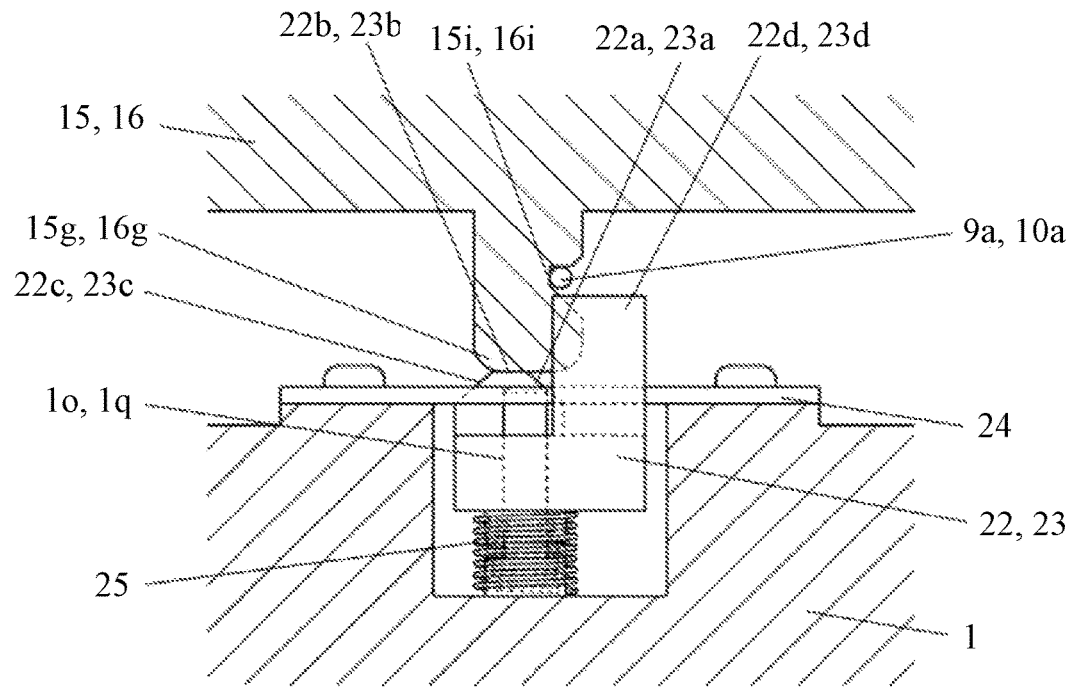
FIG. 5C is a schematic section of the relationship among the cam gear, the assist spring, and the spring restricting member in the shutter apparatus according to the first embodiment viewed from the radial direction of the cam gear.
Figure 5D:
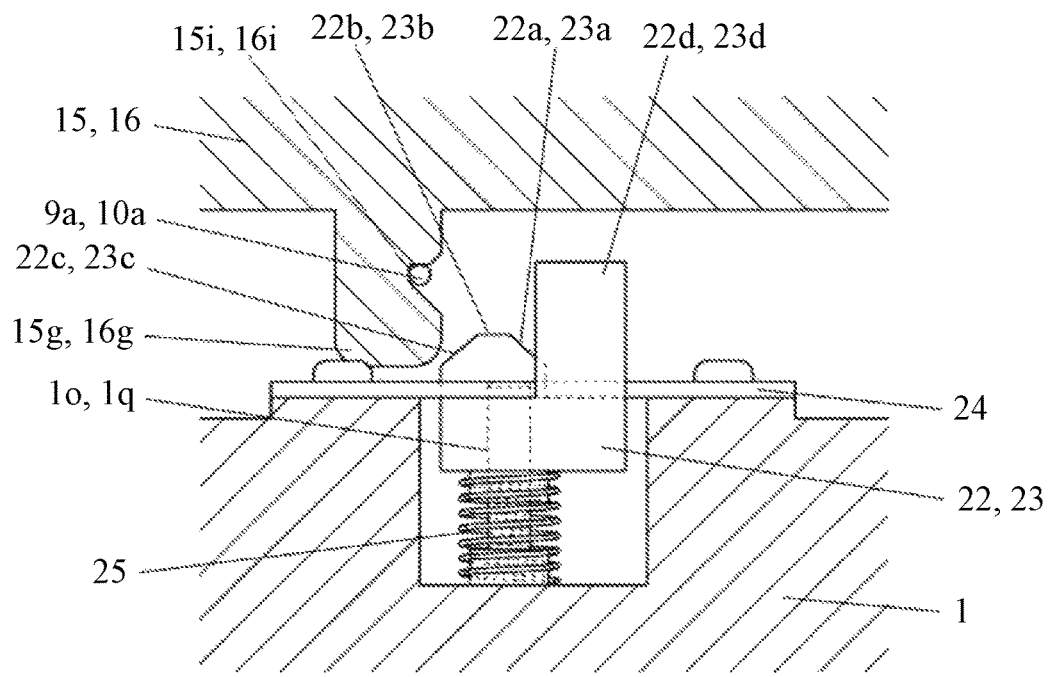
FIG. 5D is a schematic section of the relationship among the cam gear, the assist spring, and the spring restricting member in the shutter apparatus according to the first embodiment viewed from the radial direction of the cam gear.

FIGS. 5B, 5C, and 5D are schematic views of the first cam gear 15 and the second cam gear 16 moving from the angles in the state A to the angles in the state B. When the switch (SW2) 499 turns on (where the photographer provides an image capturing start instruction), the motors 19 and 20 are driven. When the first cam gear 15 and the second cam gear 16 start rotating in the right rotating direction in FIG. 6, as illustrated in FIG. 5B, the cam gear pressing parts 15g and 16g contact the first cam surfaces 22a and 23a provided on the assist spring restricting members 22 and 23. The assist spring restricting members 22 and receive downward forces (in the image sensor 403 direction) in FIG. 5B from the pressing parts 15g and 16g in the first cam gear 15 and the second cam gear 16. The assist spring restricting members 22 and 23 that receive the downward forces (in the image sensor 403 direction) in FIG. 5B move so that the spring contact 22d can retreats from the loci of the assist spring arms 9a and 10a.

When the spring contact part 22d completely retreats from the loci of the assist spring arms 9a and 10a, the assist spring arms 9a and 10a contact spring engagement parts 15i and 16i (projections) in the first cam gear 15 and the second cam gear 16. The assist spring arms 9a and 10a force the first cam gear 15 and the second cam gear 16 in the left direction in FIG. 5B (right rotating direction in FIG. 6). Thus, when the photographer provides the image capturing start instruction, the motors 19 and 20 start rotating the first cam gear 15 and the second cam gear 16. The assist spring restricting members 22 and 23 release the restrictions of the first assist spring 9 and the second assist spring 10 as the motors 19 and 20 rotate.

The further rotation provides the state illustrated in FIG. 5C, and the pressing parts 15g and 16g in the first cam gear 15 and the second cam gear 16 contact the second cam surface 22b on which the assist spring restricting members 22 and 23 are provided. The pressing parts 15g and 16g maintain the retreat states of the spring contacts 22d and 23d in the assist spring restricting members 22 and 23 from the loci of the assist spring arms 9a and 10a.

When the first cam gear 15 and the second cam gear 16 reach the angles in the state B illustrated in FIG. 5D, the first cam gear 15 and the second cam gear 16 are stopped by the electrification holding powers of the motors 19 and 20. At this time, when the pressing parts 15g and 16g in the first cam gear 15 and the second cam gear 16 stop at positions where they do not contact cam surfaces on the spring restricting member 22, the motors 19 and 20 are released from the starting loads caused by the contacts and the scattering in the exposure operation can be restrained. Since the motors 19 and 20 are the stepping motors, the moving amount and time from the state A to the state B can be accurately controlled. Therefore, a proper exposure amount can be maintained by maintaining a time lag suitable for the shutter speed when the motors 19 and 20 start moving. The image sensor 403 performs reset scanning a predetermined time after the switch (SW2) 499 turns on, and starts electric accumulations for each row.

Thus, in this embodiment, the assist spring restricting members 22 and 23 can move to a first state, a second state, and a third state in the first angle range (states A to D). In the first state, the assist spring restricting members 22 and 23 are located on the loci of the first assist spring 9 and the second assist spring 10, and ready to receive forces from the first assist spring 9 and the second assist spring 10 (FIG. 5B). In the second state, the assist spring restricting members 22 and 23 retreat from the loci of the first assist spring 9 and the second assist spring 10 (FIG. 5C). In the third state, the assist spring restricting members 22 and 23 are located on the loci of the first assist spring 9 and the second assist spring 10, and free to receive forces from the first assist spring 9 and the second assist spring 10 (FIG. 5D).

The first cam gear 15 and the second cam gear 16 may include projections (spring engagement parts 15i and 16i). The assist spring restricting members 22 and 23 contact the projections and are moved in the optical axis direction, and proceed from the first state or the third state to the second state. The assist spring restricting members 22 and 23 may include first cam surfaces 22a and 23a, second cam surfaces 22b and 23b, and third cam surfaces 22c and 23c. The first cam surfaces 22a and 23a contact the first cam gear 15 and the second cam gear 16, and proceed from the first state to the second state. The second cam surfaces 22b and 23b contact the first cam gear 15 and the second cam gear 16, and maintain the second state. The third cam surfaces 22c and 23c contact the first cam gear 15 and the second cam gear 16, and proceed from the second state to the third state.

<Exposure Running>

After the first cam gear 15 and the second cam gear 16 stop at the angles in the state B, the first cam gear 15 and the second cam gear 16 receive the driving forces from the motors 19 and 20 and the forces from the first assist spring 9 and the second assist spring 10 and are driven in the right rotating direction in FIG. 6. Thereby, the first cam gear 15 and the second cam gear 16 start accelerations in the first idle running cam areas 15d and 16d illustrated in FIGS. 3 and 4.

When the first cam gear 15 and the second cam gear 16 have angles in the state C, the assist spring arms 9a and 10a contact the engagement parts 1n in the shutter base plate 1, and the first cam gear 15 and the second cam gear 16 are separated from the first assist spring 9 and the second assist spring 10. Thereby, the blade drive spring areas 15e and 16e are moved from the state D to the state E.

In the blade drive cam areas 15e and 16e, the first cam gear 15 drives the first blade unit 2 via the cam engagement pin 11b, and the second cam gear 16 drives the second blade unit 3 via the cam engagement pin 12b. Thereby, the blades 2a, 2b, and 2c that have closed the aperture 1a open the aperture 1a (or the first blade unit 2 turns from the closed state to the open state). In addition, the blades 3a, 3b, and 3c that have opened the aperture 1a open the aperture 1a (or the second blade unit 3 turns from the open state to the closed state). In this way, the first blade unit 2 and the second blade unit 3 expose the image sensor 403 with a shutter speed determined by the photographer.

Hence, in this embodiment, the first angle range (first idle running drive cam areas 15d and 16d) includes a first partial area (states A and B), a second partial area (states B and C), a third partial area (states C and D). In the first partial area, the assist spring restricting members 22 and 23 restrict the forces applied to the first cam gear 15 and the second cam gear 16 in the first assist spring 9 and the second assist spring 10. In the second partial area, the first cam bear 15 and the second cam gear 16 are rotated by the driving forces from the motors 19 and 20, and the forces from the first assist spring 9 and the second assist spring 10 configured to assist rotations of the first cam gear 15 and the second cam gear 16. In the third partial area, the first cam gear 15 and the second cam gear 16 are rotated by the driving forces from the motors 19 and 20 without being forced by the first assist spring 9 and the second assist spring 10.

<Exposure Running Completion>

When the first cam gear 15 and the second cam gear 16 have the angles in the state E, the blade drive cam areas 15e and 16e illustrated in FIGS. 3 and 4 turn to the second idle running cam areas 15f and 16f. When the first cam gear 15 and the second cam gear 16 have the angles in the state F, the movable ends 15h and 16h in the first cam gear 15 and the second cam gear 16 contact the contact parts 17b and 17d in the holder member 17. Thereby, the first cam gear 15 and the second cam gear 16 stop driving in the right rotating direction.

Figure 7:
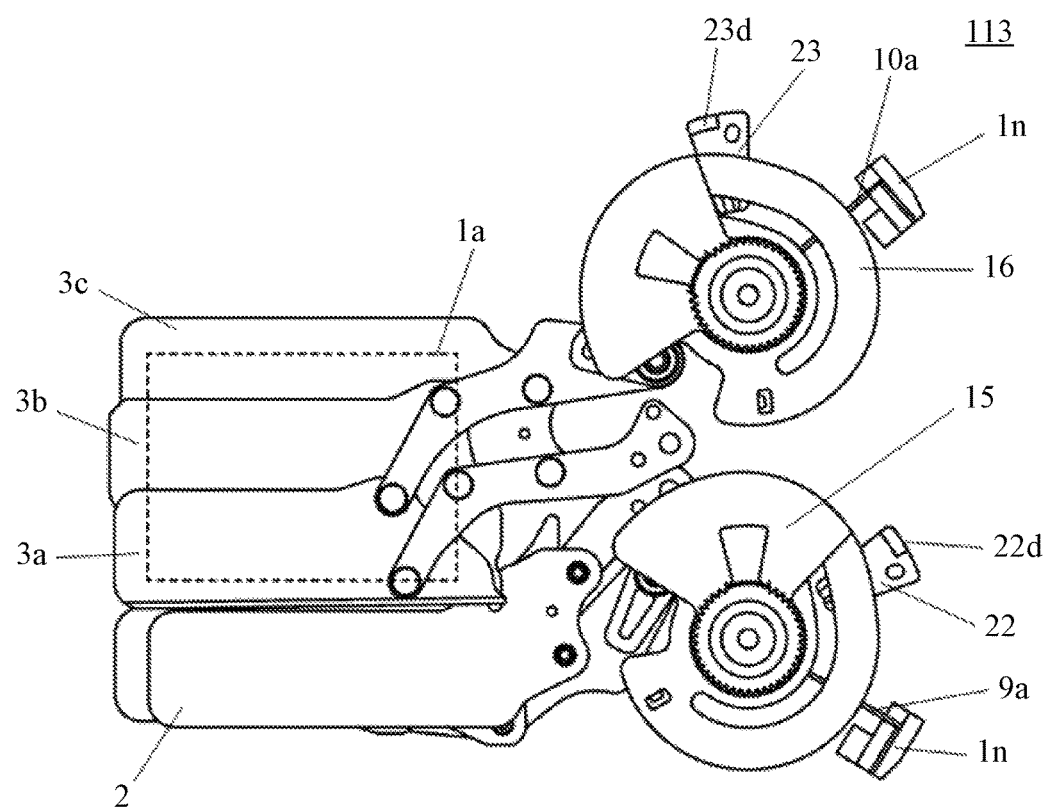
FIG. 7 illustrates a blade running completion state in the shutter apparatus according to the first embodiment.

At this time, as illustrated in FIG. 7, the first blade unit 2 is folded, the second blade unit 3 is unfolded, and the aperture 1a is closed by the blades 3a, 3b, and 3c. FIG. 7 illustrates the exposure running completion (blade running completion) state. The image capturing apparatus 400 can start still-image reading scanning from the image sensor 403.

<Blade Running Back—Spring Charge (Spring Lock Activation>

When a predetermined time period passes in the state F, the first cam gear 15 and the second cam gear 16 are driven by the motors 19 and 20 in the left rotating direction in FIG. 7. The first cam gear 15 and the second cam gear 16 pass the blade drive cam areas 15d and 16d illustrated in FIGS. 3 and 4, the first blade unit 2 is returned to the unfolded state, and the second blade unit 3 is returned to the folded state. After the further rotation, the engagement parts 15i and 16i in the first cam gear 15 and the second cam gear 16 contact the assist spring arms 9a and 10a at the angles in the state C, and the assist springs 9 and 10 are charged.

Figure 5E:
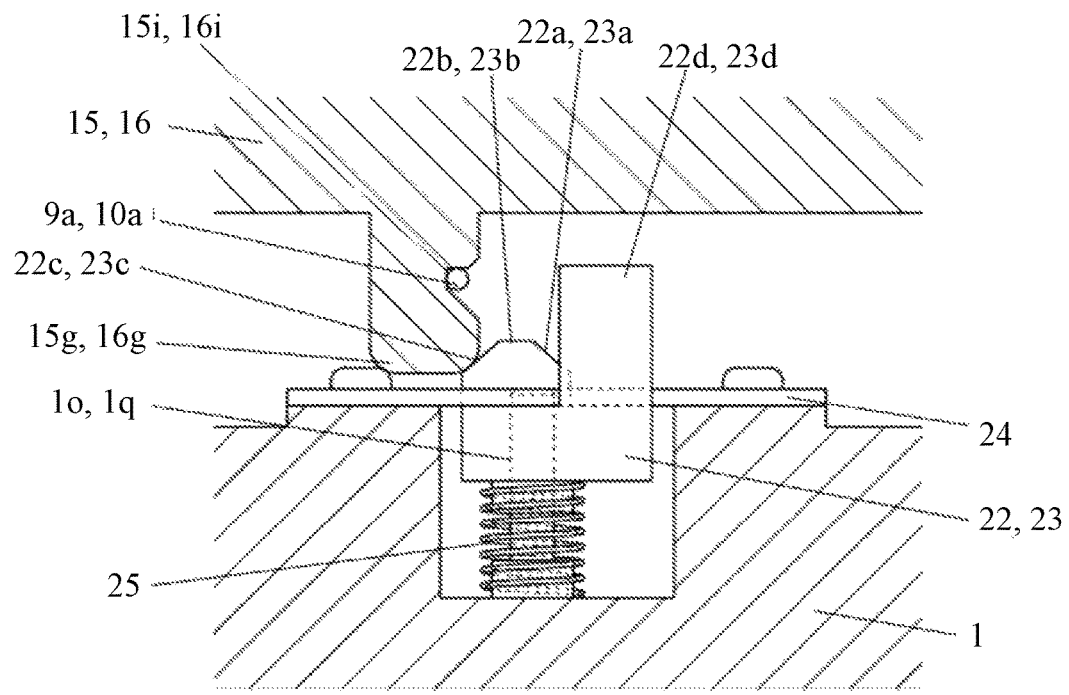
FIG. 5E is a schematic section of the relationship among the cam gear, the assist spring, and the spring restricting member in the shutter apparatus according to the first embodiment viewed from the radial direction of the cam gear.
Figure 5F:
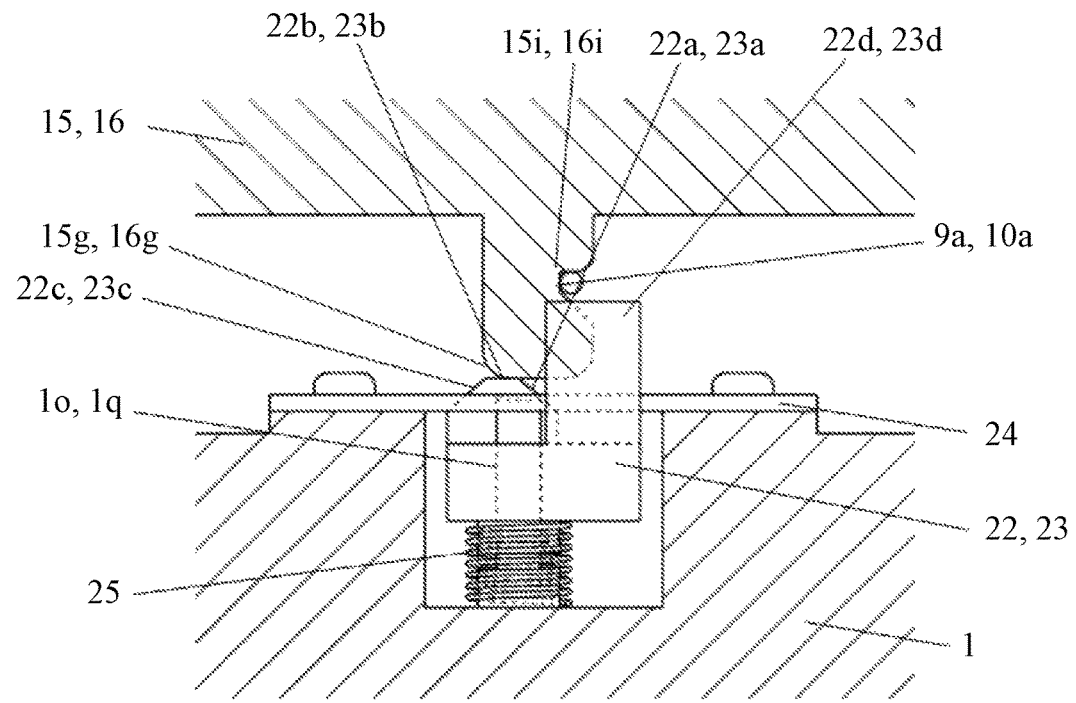
FIG. 5F is a schematic section of the relationship among the cam gear, the assist spring, and the spring restricting member in the shutter apparatus according to the first embodiment viewed from the radial direction of the cam gear.
Figure 5G:
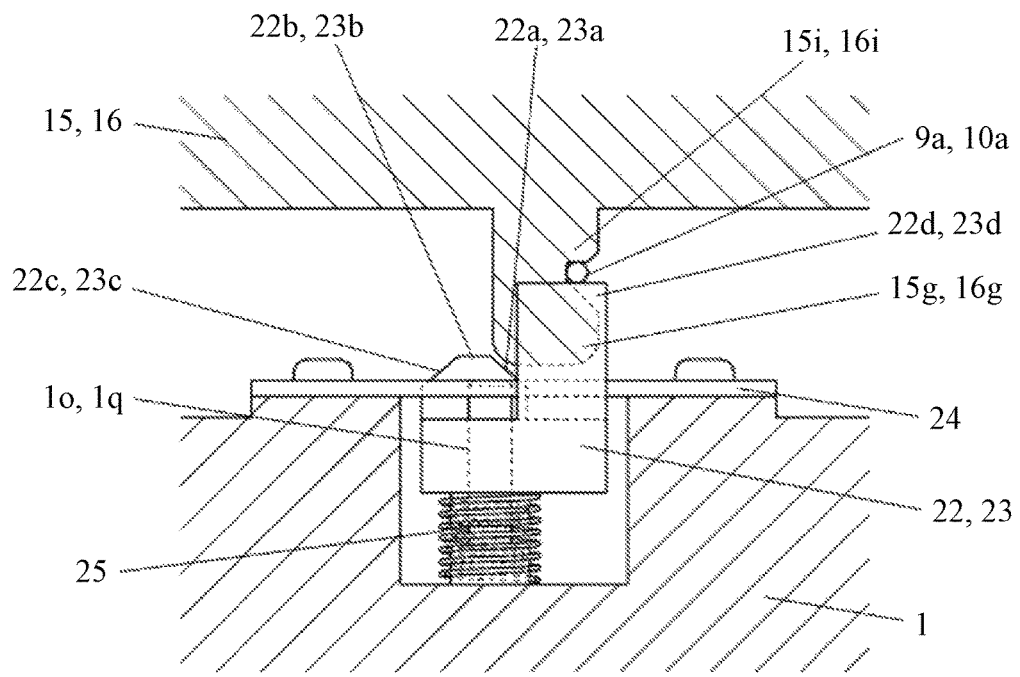
FIG. 5G is a schematic section of the relationship among the cam gear, the assist spring, and the spring restricting member in the shutter apparatus according to the first embodiment viewed from the radial direction of the cam gear.

FIGS. 5E, 5F, and 5G schematically illustrate the transitions of the first cam gear 15 and the second cam gear 16 from the state B to the angles in the state A while the first assist spring 9 and the second assist spring 10 are charged. When the first cam gear 15 and the second cam gear 16 pass the state B, the cam gear pressing parts 15g and 16g contact the second cam surfaces 22c in the assist spring restricting members 22 and 23 are provided, as illustrated in FIG. 5E. The assist spring restricting members 22 and 23 receive the forces from the cam gear pressing parts 15g and 16g in the downward direction in FIG. 5E or the image sensor 403 direction. The spring restricting members 22 and 23 that have received the forces in the downward direction in FIG. 5E (or the image sensor 403 direction) move to the state in which the spring contact parts 22d retreat from the loci of the assist spring arms 9a and 10a. Hence, the assist spring arms 9a and 10a pass the locus without contacting the spring contact parts 22d and 23d.

When the cam gear pressing parts 15g and 16g are separated from the assist spring restricting members 22 and 23, the spring restricting members 22 and 23 are forced by the compression spring 25 in the upward direction in FIG. 5F (or the object direction). Hence, as illustrated in FIG. 5G, the spring contact part 22d press the assist spring arms 9a and 10a in the illustrated upward direction (or object direction). At this time, the engagement parts 15i and 16i in the first cam gear 15 and the second cam gear 16 restrict the positions of the assist spring arms 9a and 10a in the illustrated upward direction (or the object direction). Therefore, the assist spring arms 9a and 10a can go over the assist spring restricting members 22 and 23 without moving the upward direction (object direction) in FIG. 5G.

When the first cam gear 15 and the second cam gear 16 go over the angles in the state A, the spring contact parts 22d move to the loci of the assist spring arms 9a and 10a. The spring contact parts 22d receive the forces from the first assist spring 9 and the second assist spring 10 in the left direction in FIG. 5G or in the right rotating direction in FIG. 7. The movable ends 15h and 16h in the first cam gear 15 and the second cam gear 16 contact the contact parts 17a and 17c in the holder member 17, and the first cam gear 15 and the second cam gear 16 stop driving in the left rotating direction. The first cam gear 15 and the second cam gear 16 are held at the angles in the state A by the cogging torques of the motors 19 and 20. The image capturing apparatus 400 returns to the image capturing standby state illustrated in FIG. 5A, and stands by the next release.

As described above, this embodiment mechanically holds the first assist spring 9 and the second assist spring 10 in their charged states, which assist the accelerations of the cam gears 15 and 16 through the assist spring restricting members 22 and 23. This configuration can restrain the power consumption amount in the image capturing standby state, and shorten the release time lag.

Second Embodiment

Figure 9:
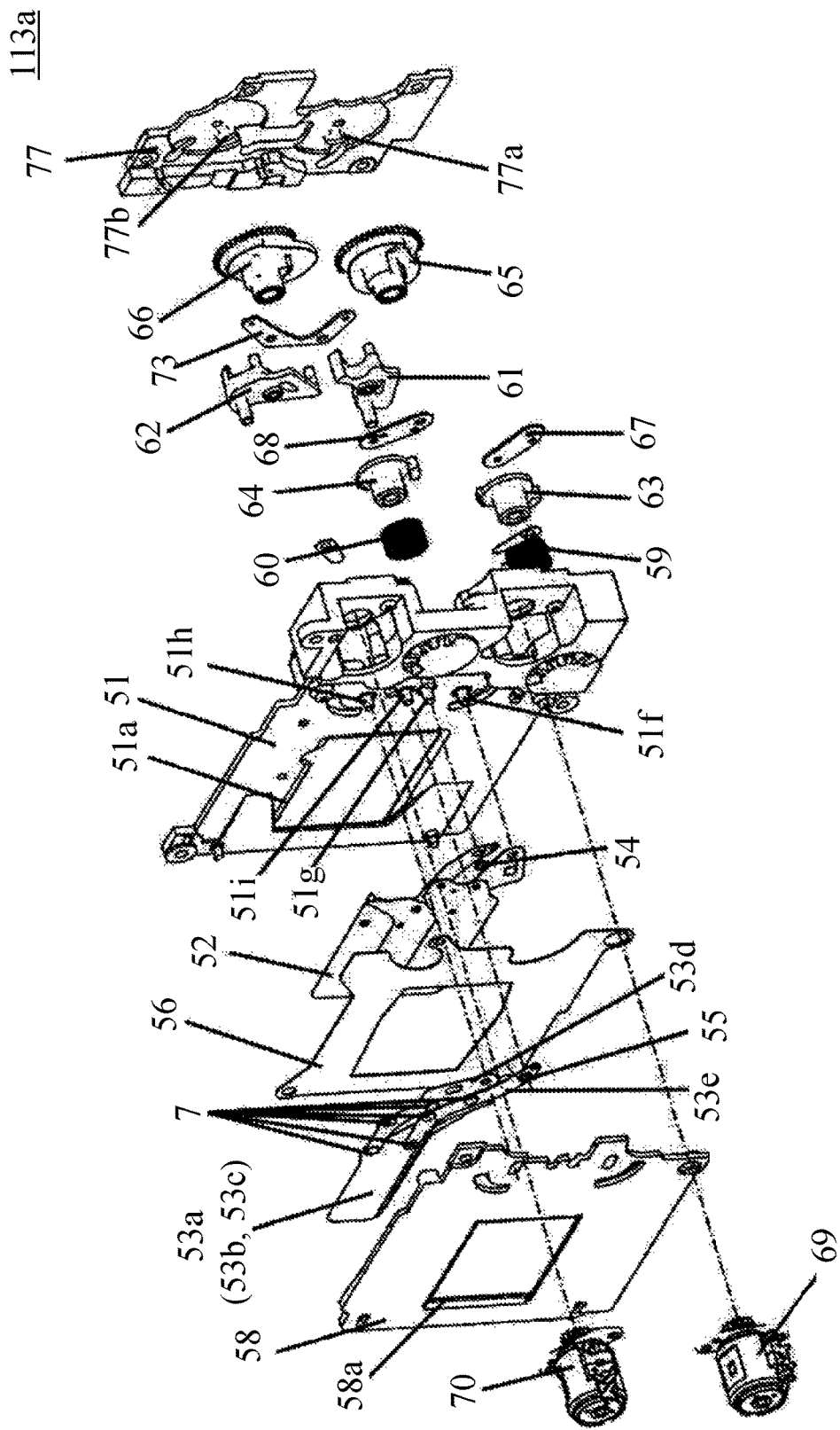
FIG. 9 is an exploded perspective view of a shutter apparatus according to a second embodiment viewed from an object side.
Figure 10:
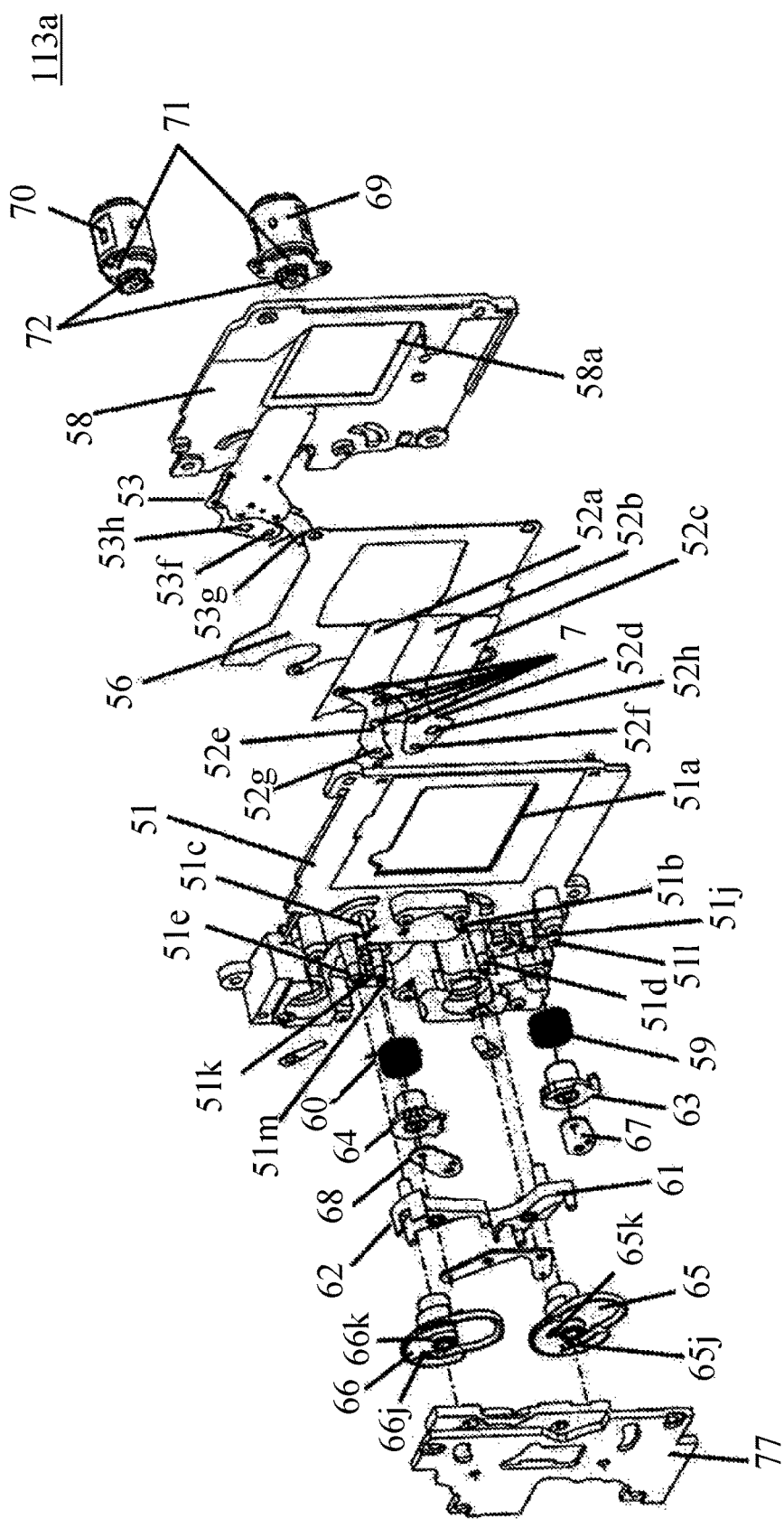
FIG. 10 is an exploded perspective view of a shutter apparatus according to the second embodiment viewed from an image sensor side.
Figure 11:
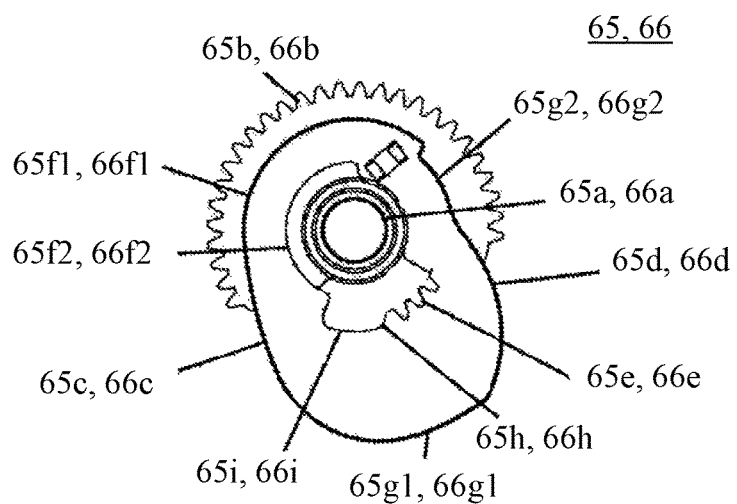
FIG. 11 is a front view of a cam gear in the shutter apparatus according to the second embodiment viewed from the object side.
Figure 12A:
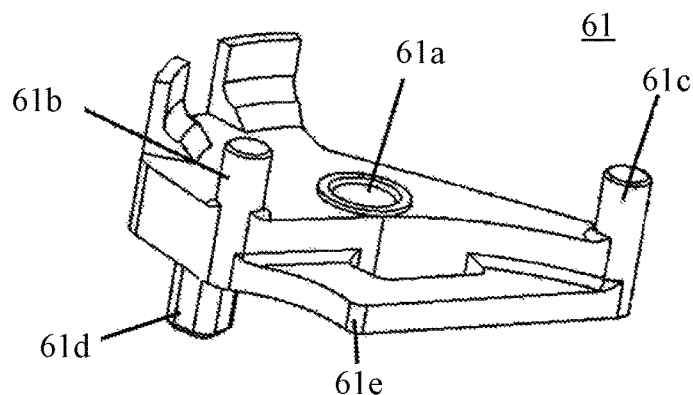
FIGS. 12A and 12B are perspective views of a drive member in the shutter apparatus according to the second embodiment.
Figure 12B:
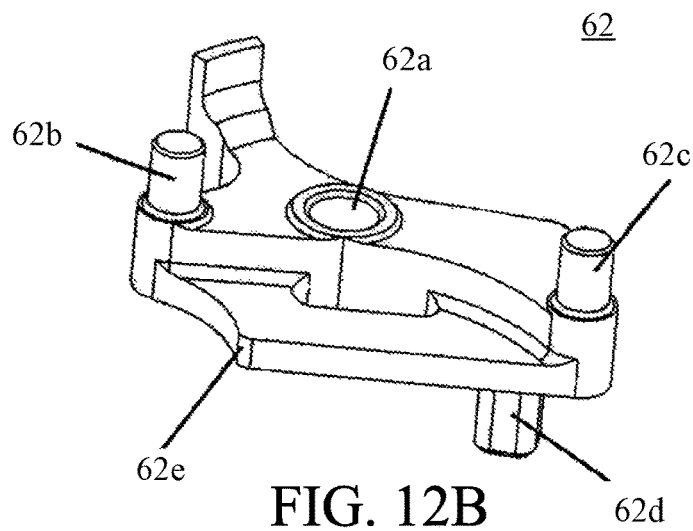
Figure 13:
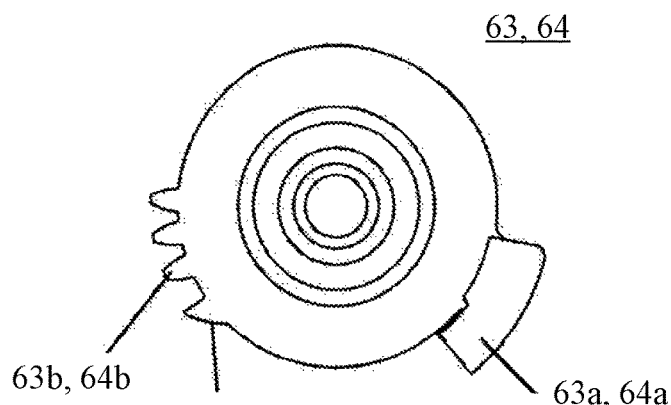
FIG. 13 is a front view of an assist gear in the shutter apparatus according to the second embodiment viewed from the object side.

Next follows a description of the image capturing apparatus according to a second embodiment of the present invention. Referring now to FIGS. 9 to 13, a description will be given of the configuration of the focal plane shutter 113 according to this embodiment. FIG. 9 is an exploded perspective view of the focal plane shutter 113a according to this embodiment viewed from the object side. FIG. 10 is an exploded perspective view of the focal plane shutter 113a viewed from the image sensor 403 side. FIG. 11 is a front view of a first cam gear 65 and a second cam gear 66 (cam members) viewed from the object side. FIGS. 12A and 12B are perspective views of a first drive member 61 and a second drive member 62. FIG. 13 is a front view of a first assist gear 63 and a second assist gear 64 (transmission members) viewed from the object side.

A cover plate 58 is attached to a shutter base plate 51 on the object side. A first blade unit 52 that includes blades 52a, 52b, and 52c, and blade arms 52d and 52e and a second blade unit 53 that includes blades 53a, 53b, and 53c, and blade arms 53d and 53e are provided between the shutter base plate 51 and the cover plate 58. The shutter base plate 51 and the cover plate 58 have apertures 51a and 58a (openings). Each of the first blade unit 52 and the second blade unit 53 is a light shield movable between a closed state for closing the aperture 51a and an open state for opening the aperture 51a. Shafts 51b and 51c are provided on the shutter base plate 51 on the image sensor 403 side, the first drive member 61 is rotatably attached to the shaft 51b, and the second drive member 62 is rotatably attached to the shaft 51c.

Shafts 51d and 51e are provided on the shutter base plate 1, the shaft 51d is engaged with a hole 65a in the first cam gear 65, and the shaft 51e is engaged with a hole 66a in the second cam gear 66. Shafts 51f, 51g, 51h, and 51i are provided on the shutter base plate 51 on the object side. A first blade unit 52 is rotatably attached to the shafts 51f and 51g, and a second blade unit 53 is rotatably attached to the shaft 51h and 51i.

The first drive member 61 is rotatable because the shaft 51b on the shaft base plate 51 is engaged with the hole 61a. The first cam engagement pin 61b in the first drive member 61 can contact the first blade drive area 65c in the first cam gear 65, and the second cam engagement pin 61c can contact the second blade drive area 65d. As the first cam gear 65 rotates, the first drive member 61 is driven while the first cam engagement pin 61b moves along the first blade drive area 65c and the second cam engagement pin 61c moves along the first blade drive area 65d. Thus, the first drive member 61 is a drive member rotatable in connection with the first blade unit 51.

The second drive member 62 is rotatable because the shaft 51c on the shaft base plate 51 is engaged with the hole 62a. The first cam engagement pin 62b in the second drive member 62 can contact a first blade drive area 66c in the second cam gear 66, and the second cam engagement pin 62c can contact a second blade drive area 66d. As the second cam gear 66 rotates, the second drive member 62 is driven while the first cam engagement pin 62b moves along the first blade drive area 66c and the second cam engagement pin 62c moves along the first blade drive area 66d. Thus, the first drive member 61 and the second drive member 62 are drive members rotatable in connection with the second blade unit 52.

The first blade unit 52 includes two blade arms 52d and 52e, and three blades 52a, 52b, and 52c. The shafts 51f and 51g are rotatably engaged with holes 52f and 52g in the two blade arms 52d and 52e on the object side of the shutter base plate 51. The three blades 52a, 52b, and 52c are supported on the blade arms 52d and 52e via the connecting shaft 7. The blade arm 52 has a hole 52h, with which a drive pin 61d on the first drive member 61 is engaged. Thereby, as the first drive member 61 rotates, the blades 52a, 52b, and 52c are movable between the closed state in which the blades 52a, 52b, and 52c cover the aperture 51a in the shutter base plate 51, and the open state in which the blades 52a, 52b, and 52c retreat from the aperture 51a.

The second blade unit 53 includes two blade arms 53d and 53e, and three blades 53a, 53b, and 53c. The shafts 53h and 53i are rotatably engaged with holes 51f and 51g in the two blade arms 53d and 53e on the object side of the shutter base plate 51. The three blades 53a, 53b, and 53c are supported on the blade arms 53d and 53e via the connecting shaft 7. The blade arm 53 has a hole 53h, with which a drive pin 62d on the second drive member 62 is engaged. Thereby, as the second drive member 62 rotates, the blades 53a, 53b, and 53c are movable between the closed state in which the blades 53a, 53b, and 53c cover the aperture 51a in the shutter base plate 51, and the open state in which the blades 53a, 53b, and 53c retreat from the aperture 51a.

The first assist gear 63 is rotatably supported around the shaft 51j of the shutter base plate 51 on the image sensor 403 side, and the axial direction is restricted by a first pressing plate 67. A gear part 63b in the first assist gear 63 is a toothless gear and engageable with a second gear part 65e in the first cam gear 65 depending on a rotating position. The first assist spring 59 (forcing member) is guided by an external form part of the first assist gear 63. The first assist spring 59 is charged so as to generate the force in the right rotating direction viewed from the image sensor 403 side while a first arm 59a is engaged with the shutter base plate 51 and a second arm 59b is engaged with the engagement part 63a in the first assist gear 63. At this time, the first assist gear 62 is held while the engagement part 63a contacts a fixed end 511 provided on the shutter base plate and the first assist spring 59 is charged.

The second assist gear 63 is rotatably supported around the shaft 51k on the image sensor 403 side of the shutter base plate 51, and the axial direction is restricted by a second pressing plate 68. A gear part 64b in the second assist gear 64 is a toothless gear and engageable with a second gear part 66e in the second cam gear 66 depending on a rotating position. The second assist spring 60 (forcing member) is guided by an external form part of the second assist gear 64. The second assist spring 60 is charged so as to generate the force in the right rotating direction viewed from the image sensor 403 side while a first arm 60a is engaged with the shutter base plate 51 and a second arm 60b is engaged with the engagement part 64a in the second assist gear 64. At this time, the second assist gear 64 contacts a fixed end 51m provided on the shutter base plate, and is held while the second assist spring 60 is charged.

Referring now to FIGS. 11 to 13, a description will be given of configurations of the first cam gear 55, the second cam gear 56, the first drive member 61, the second drive member 62, the first assist gear 63, and the second assist gear 64. The first cam gear 65 and the second cam gear 66, and the first assist gear 63 and the second assist gear 64 have shapes identical to each other, and are collectively illustrated in FIGS. 11 and 13.

The first cam gear 65 has a first idle running cam area 65f1 which the first cam engagement pin 61b contacts. The first idle running cam area 65f1 holds the first blade unit 52 in an unfolded state via the drive pin 61d. At this time, when the drive member 61 attempts to rotate in the right rotating direction viewed from the image sensor 403 side, the third cam engagement pin 61e is restricted by the first restricting cam surface 65f2 in the first cam gear 65 and thus the first blade unit 52 is held at the predetermined position in the unfolded state. The first cam gear 65 has a second idle running cam area 65g1 which the second cam engagement pin 61c contacts. The second idle running cam area 65g1 holds the first blade unit 52 in a folded state via the drive pin 61d. At this time, when the drive member 61 attempts to rotate in the left rotating direction viewed from the image sensor 403 side, the second cam engagement pin 61c is restricted by the second restricting cam surface 65g2 in the first cam gear 65 and the first blade unit 52 is held at the predetermined position in the folded state. The first cam gear 65 has the first blade drive area 65c and the second blade drive area 65d. In the first blade drive area 65c, the first cam gear 65 contacts the first cam engagement pin 61b, drives the first blade unit 52 via the drive pin 61d, and transfers the aperture 51a from the closed state to the open state. In the second blade drive area 65d, the first cam gear 65 contacts the second cam engagement pin 61c, drives the first blade unit 52 via the drive pin 61d, and transfers the aperture 51a from the open state to the closed state. The first blade drive area 65c and the first idle running cam area 65f1, the first blade drive area 65c and the second idle running cam area 65g1, the second blade drive area 65d and the second restricting cam surface 65g2 are smoothly connected to each other. Hence, driving the blades can be started without generating a large impact.

The first cam gear 65 has a second gear part 65e connected to the gear part 63b in the first assist gear 63 depending on its rotating phase. As described later, as the first cam gear 65 rotates in the left rotating direction viewed from the object side, the second gear part 65e in the first cam gear 65 is connected to the gear part 63b in the first assist gear 63. Thereafter, the pressing cam surface 65h on the first cam gear 65 contacts the cam surface 63c on the first assist gear 63, and rotates the first assist gear 63. As the first cam gear 65 further rotates, the assist holding cam surface 65i smoothly connected to the cam surface 65h and formed concentrically to the hole 65a contacts the cam surface 63c in the first assist gear 63. At this time, the first assist gear 63 is forced by the first assist spring 59 in the left rotating direction viewed from the object side, but the force applied to the first cam gear 65 in the rotating direction is smaller than a frictional force generated between the assist holding cam surface 65i and the cam surface 63c. Hence, the first cam gear 65 is never rotated by the force of the first assist spring 59.

The second cam gear 66 has a first idle running cam area 66f1 which the first cam engagement pin 62b contacts. The first idle running cam area 66f1 holds the second blade unit 53 in the folded state via the drive pin 62d. At this time, when the second drive member 62 attempts to rotate in the right rotating direction viewed from the image sensor 403 side, the third cam engagement pin 62e is restricted by the first restricting cam surface 66f2 in the second cam gear 66 and the second blade unit 53 is held at the predetermined position in the folded state. The second cam gear 66 has a second idle running cam area 66g1 which the second cam engagement pin 62c contacts. The second idle running cam area 66g1 holds the second blade unit 53 in the unfolded state via the drive pin 62d. At this time, when the second drive member 62 attempts to rotate in the left rotating direction viewed from the image sensor 403 side, the second cam engagement pin 62c is restricted by the second restricting cam surface 66g2 in the second cam gear 66 and the second blade unit 53 is held at the predetermined position in the unfolded state. The second cam gear 66 has the first blade drive area 66c and the second blade drive area 66d. In the first blade drive area 66c, the second cam gear 66 contacts the first cam engagement pin 62b, drives the second blade unit 53 via the drive pin 62d, and transfers the aperture 51a from the open state to the closed state. In the second blade drive area 66d, the second cam gear 66 contacts the second cam engagement pin 62c, drives the second blade unit 53 via the drive pin 62d, and moves the aperture 51a from the closed state to the open state. The first blade drive area 66c and the first idle running cam area 66f1, the first blade drive area 66c and the second idle running cam area 66g1, the second blade drive area 66d and the second restricting cam surface 66g2 are smoothly connected to each other. Hence, driving the blades can be started without generating a large impact.

The second cam gear 66 has a second gear part 66e connected to the gear part 64b in the second assist gear 64 depending on its rotating phase. As described later, as the second cam gear 66 rotates in the left rotating direction viewed from the object side, the second gear part 66e in the second cam gear 66 is connected to the gear part 64b in the second assist gear 64. Thereafter, the pressing cam surface 66h on the second cam gear 66 contacts the cam surface 64c on the second assist gear 64, and rotates the second assist gear 64. As the second cam gear 66 further rotates, the assist holding cam surface 66i smoothly connected to the cam surface 66h and formed concentrically to the hole 66a contacts the cam surface 64c in the second assist gear 64. At this time, the second assist gear 64 is forced by the assist spring 60 in the left rotating direction viewed from the object side, but the force applied to the second cam gear 66 in the rotating direction is smaller than a frictional force generated between the assist holding cam surface 66i and the cam surface 64c. Hence, the second cam gear 66 is never rotated by the force of the assist spring 60.

As illustrated in FIG. 10, motors 69 and 70 are attached to a motor plate 71, and the motor plate 71 is fixed onto a shutter base plate 51. In addition, a pinion gear 72 is attached to an output shaft 69a in the motor 69. The pinion gear 72 is engaged with the gear parts 65b and 66b in the cam gears 65 and 66, and transmits the torques from the motors 69 and 70 to the cam gears 65 and 66. Each of the motors 69 and 70 is a stepping motor configured to switch the electrification state of the coil according to the predetermined time interval.

Referring now to FIGS. 14A to 18B, a description will be given of the operation of the focal plane shutter 113a. FIGS. 14A to 18B illustrate a relationship between the position of the blade unit in the focal plane shutter 113a and the rotating angles of the cam gears 65 and 66 in the image capturing apparatus 400 viewed from the object side. FIGS. 14A, 15A, 16A, 17A, and 18A illustrate image capturing states of the first blade unit 52, the first assist spring 59, the first drive member 61, the first assist gear 63, and the first assist gear 65. FIGS. 14B, 15B, 16B, 17B, and 18B illustrate image capturing states of the second blade unit 53, the second assist spring 60, the second drive member 62, the second assist gear 64, and the second assist gear 66.

<Image Capturing Standby State (Spring Lock State)>

Figure 14A:
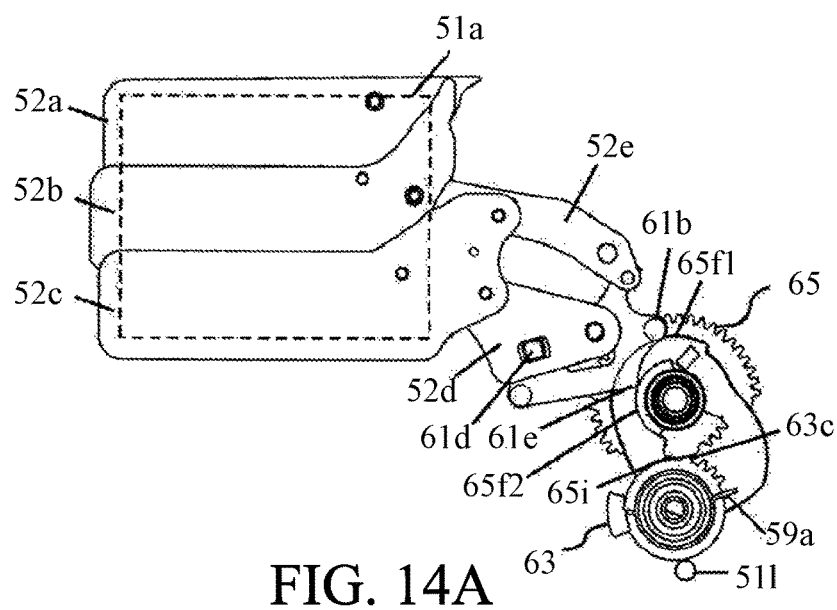
FIGS. 14A and 14B illustrate a standby state before image capturing in the shutter apparatus according to the second embodiment.
Figure 14B:
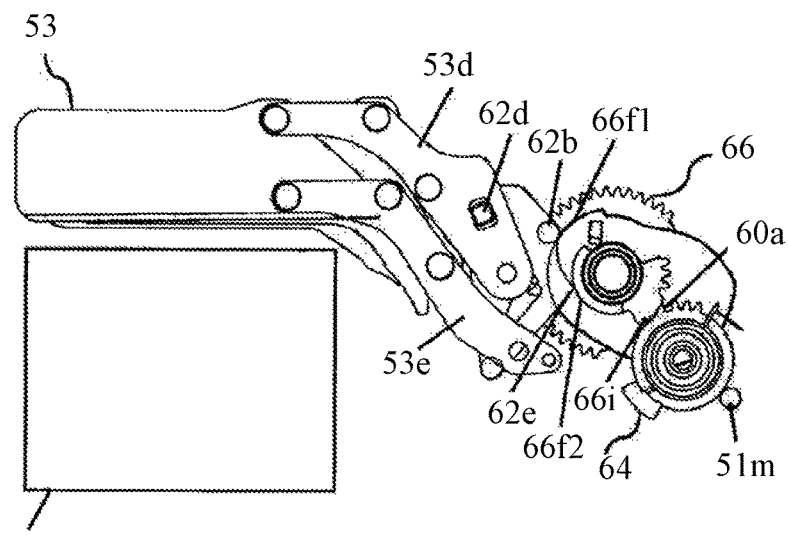

FIGS. 14A and 14B illustrate a standby state before image capturing of the focal plane shutter 113a according to this embodiment. Each of the first cam gear 65 and the second cam gear 66 has an angle in the state A illustrated in FIG. 4. As illustrated in FIG. 14A, the first blade unit 52 is unfolded, the second blade unit 53 is folded, and the aperture 51a is closed by the blades 52a, 52b, and 52c.

In the first drive member 61 and the second drive member 62, the first cam engagement pins 61b and 62b contact the first idle running cam areas 65f1 and 66f1. In the first drive member 61 and the second drive member 62, the third cam engagement pin 61e and 62e are restricted from rotating in the left viewed from the object side by the first restricting cam surfaces 65f2 and 66f2 and thus the blade units 52 and 53 are held at the predetermined position.

The first assist spring 59 and the second assist spring 60 are charged while the arms 59a and 60a in are fixed onto the shutter base plate and the arms 59b and 60b contact the engagement parts 63a and 64a in the first assist gear 63 and the second assist gear 64. Therefore, the first assist spring 59 and the second assist spring 60 force the first assist gear 63 and the second assist gear 64 in the left rotating direction viewed from the object side. Cam surfaces 63c and 64c in the first assist gear 63 and the second assist gear 64 contact the assist holding cam surfaces 65i and 66i. At this time, the first assist gear 63 and the second assist gear 64 are forced in the left rotating direction viewed from the object side by the first assist spring 59 and the second assist spring 60. However, the forces applied to the first cam gear 65 and the second cam gear 66 in the rotating direction are smaller than frictional forces generated between the assist holding cam surfaces 65i and 66i and the cam surfaces 63c and 64c. Hence, the first cam gear 65 and the second cam gear 66 are not rotated by the forces of the first assist spring 59 and the second assist spring 60. The first cam gear 65 and the second cam gear 66 can be stopped by the cogging torques of the motors 69 and 70, maintain the angles in the state A and stand by without electrifying the motors 69 and 70.

In this standby state, the focal plane shutter 113a waits for the switch (SW1) 498 to turn on. When the switch (SW1) 498 turns on, an unillustrated distance measuring unit in the image capturing apparatus 400 (see FIG. 8) measures a distance to the object, and the lens controller 491 performs an image capturing preparation, such as focusing by driving the image capturing lens.

<Spring Unlock>

Figure 15A:
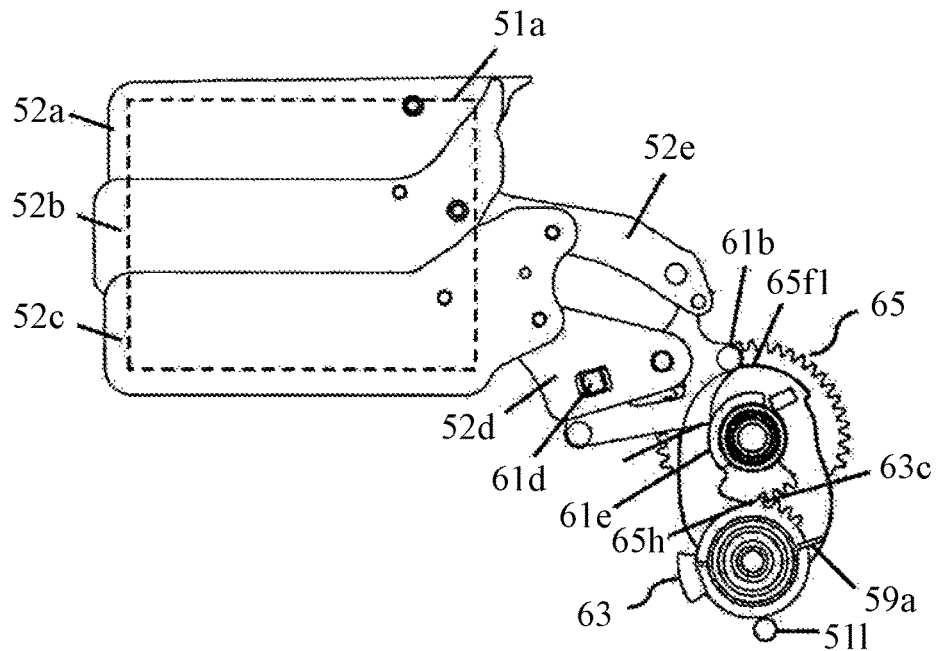
FIGS. 15A and 15B illustrate a transition state of the cam gear in the shutter apparatus according to the second embodiment.
Figure 15B:
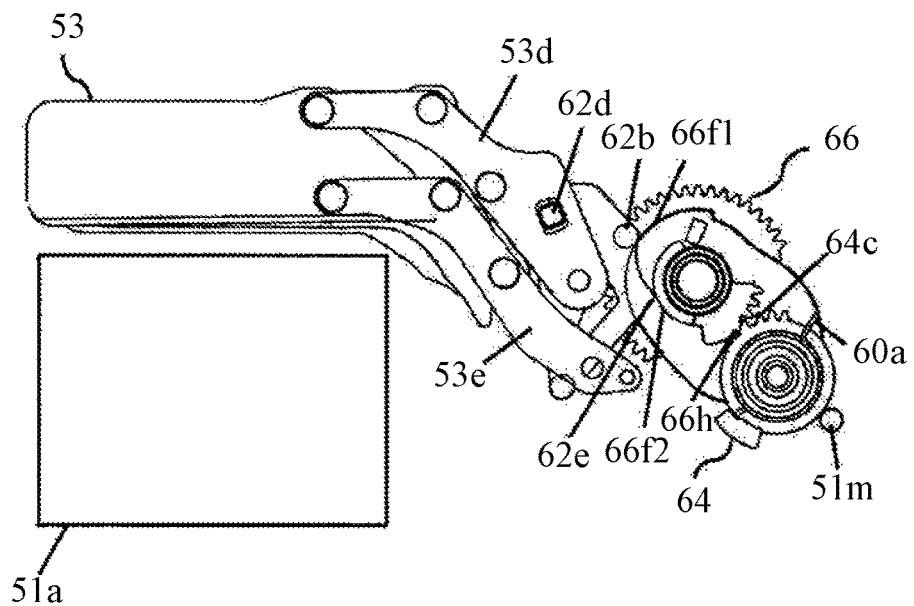

FIGS. 15A and 15B illustrate the first cam gear 65 and the second cam gear 66 moving from the angles in the state A illustrated in FIG. 4 to the angles in the state B. When the switch (SW2) 499 turns on, the motors 69 and 70 are driven.

The first cam gear 65 and the second cam gear 66 start rotating in the right rotating direction in FIG. 14. At this time, as illustrated in FIGS. 15A and 15B, the cam surfaces 63c and 64c on the first assist gear 63 and the second assist gear 64 contact the pressing cam surfaces 65h and 66h on the first cam gear 65 and the second cam gear 66. The first cam gear 65 and the second cam gear are forced in the right rotating direction viewed from the object side.

As illustrated in FIGS. 15A and 15B, when the first cam gear 65 and the second cam gear 66 reach the angles in the state B, the first cam gear 65 and the second cam gear 66 may be stopped by the electrification holding powers of the motors 69 and 70. In the state B, the first cam gear 65 and the second cam gear 66 are stopped. This configuration can eliminate moving start loads caused by the frictions from the assist holding cam surfaces 65i and 66i in the first cam gear 65 and the second cam gear 66 to the pressing cam surfaces 65h and the 66h and the cam surfaces 63c and 64c on the first assist gear 63 and the second assist gear 64. As a result, scattering of the exposure operation can be restrained.

Since the motors 69 and 70 are stepping motors, the moving amount and time from the state A to the state B can be accurately controlled. Therefore, a proper exposure amount can be maintained by maintaining the time lag suitable for the shutter speed when the motors 69 and 70 start moving. The image sensor 403 performs reset scanning a predetermined time after the switch (SW2) 499 turns on, and starts electric accumulations for each row.

<Exposure Running>

Figure 16A:
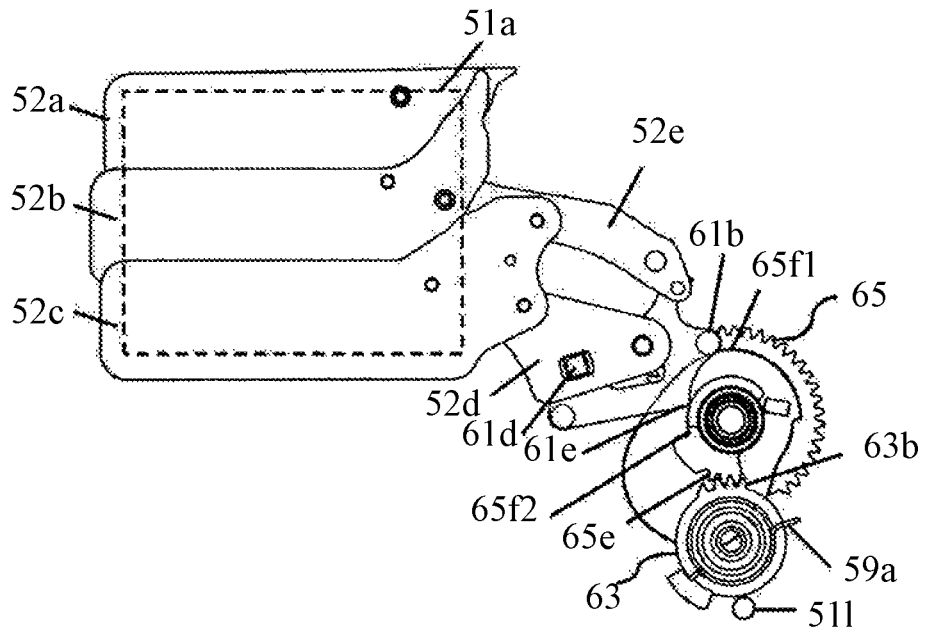
FIGS. 16A and 16B illustrate the cam gear connected with and forced by the assist gear in the shutter apparatus according to the second embodiment.
Figure 16B:
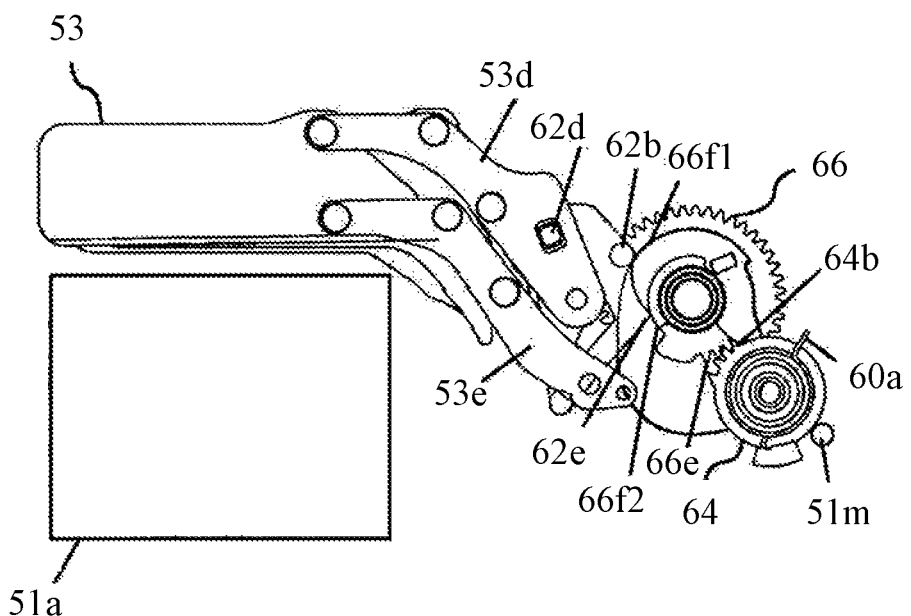
Figure 17A:
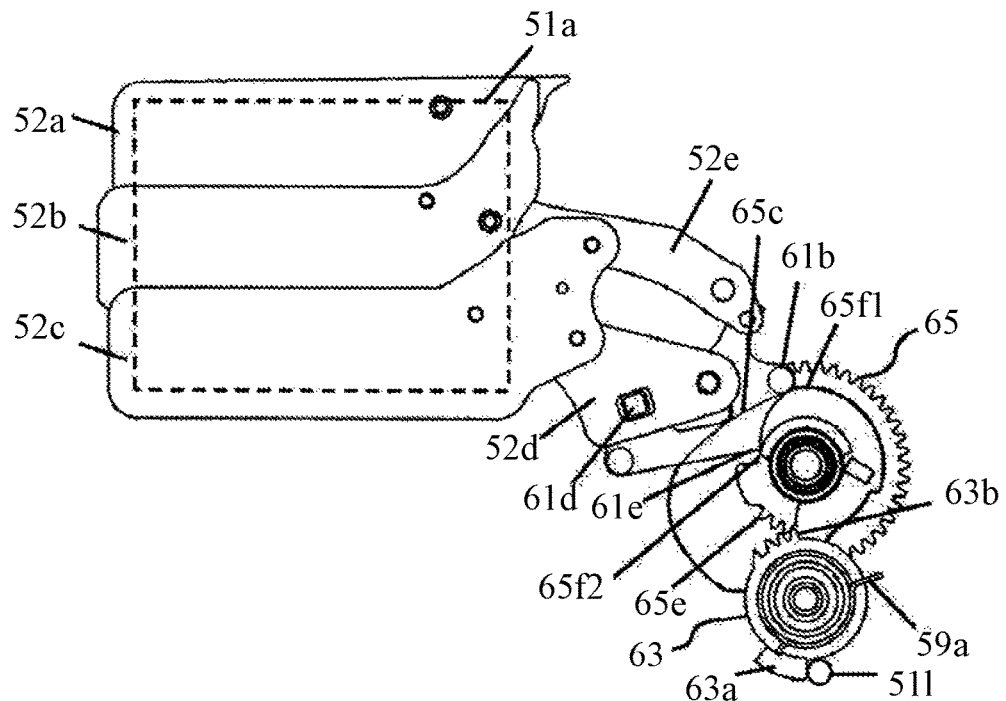
FIGS. 17A and 17B illustrate the cam gear disconnected from the assist gear in the shutter apparatus according to the second embodiment.
Figure 17B:
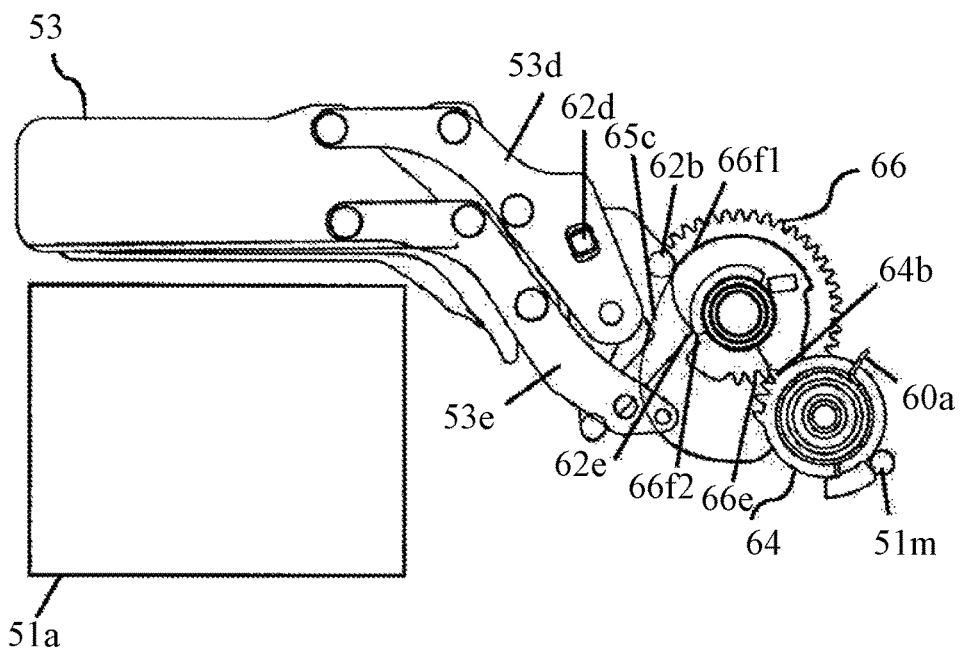

As the first cam gear 65 and the second cam gear 66 further rotate in the right rotating direction, the third gear parts 65e and 66e are connected to the gear parts 63b and 64b in the first assist gear 63 and the second assist gear 64, as illustrated in FIGS. 16A and 16B. The first cam gear 65 and the second cam gear 66 receive the driving forces from the motors 69 and 70 and the forces from the first assist spring 59 and the second assist spring 60, start accelerations in the first idle running cam areas 65f1 and 66f1 illustrated in FIG. 11. When the first cam gear 65 and the second cam gear 66 have angles C in the state C, the engagement parts 63a and 64a in the first assist gear 63 and the second assist gear 64 contact fixing end 51l and 51m provided on the shutter base plate, as illustrated in FIGS. 17A and 17B. Then, the first cam gear 65 and the second cam gear 66 are disconnected from the first assist gear 63 and the second assist gear 64, and the state is transferred from the state D to the first blade drive areas 65c and 66c in the state E.

In the first blade drive areas 65c and 66c, the first cam gear 65 drives the first blade unit 52 via the first cam engagement pin 61b, and the second cam gear 66 drives the second blade unit 53 via the cam engagement pin 12b. Thereby, the blades 52a, 52b, and 52c that have closed the aperture 51a open the aperture 51a, and the blades 53a, 53b, and 53c that have opened the aperture 51a closes the aperture 51a. Thus, the first blade unit 52 and the second blade unit 53 expose the image sensor 403 with the shutter speed determined by the photographer.

<Exposure Running Completion>

As the first cam gear 65 and the second cam gear 66 pass the angles in the state E, the second idle running areas 65g1 and 66g1 are reached as illustrated in FIG. 11. At angles in the state F, the movable ends 65j and 66j in the first cam gear 65 and the second cam gear 66 contact the contact parts 77a and 77b in the holder member 77, and stop the first cam gear 65 and the second cam gear 66 in the right rotating direction. The first drive member 61 and the second drive member 62 are restricted from rotating in the right rotating direction viewed from the object side because the first cam engagement pins 61*b* and 62*b* contact the second idle running cam areas 65*g*1 and 66*g*1. The first drive member 61 and the second drive member 62 are restricted from rotating in the left rotating direction viewed from the object side because the second cam engagement pins 61*c* and 62*c* contact the second restricting cam surfaces 65*g*2 and 66*g*2. Hence, the first drive member 61 and the second drive member 62 are held at predetermined positions, the blade units 52 and 53 are held by the drive pins 61*d* and 62*d*, and thus the re-exposure does not occur due to bounding.

Figure 18A:
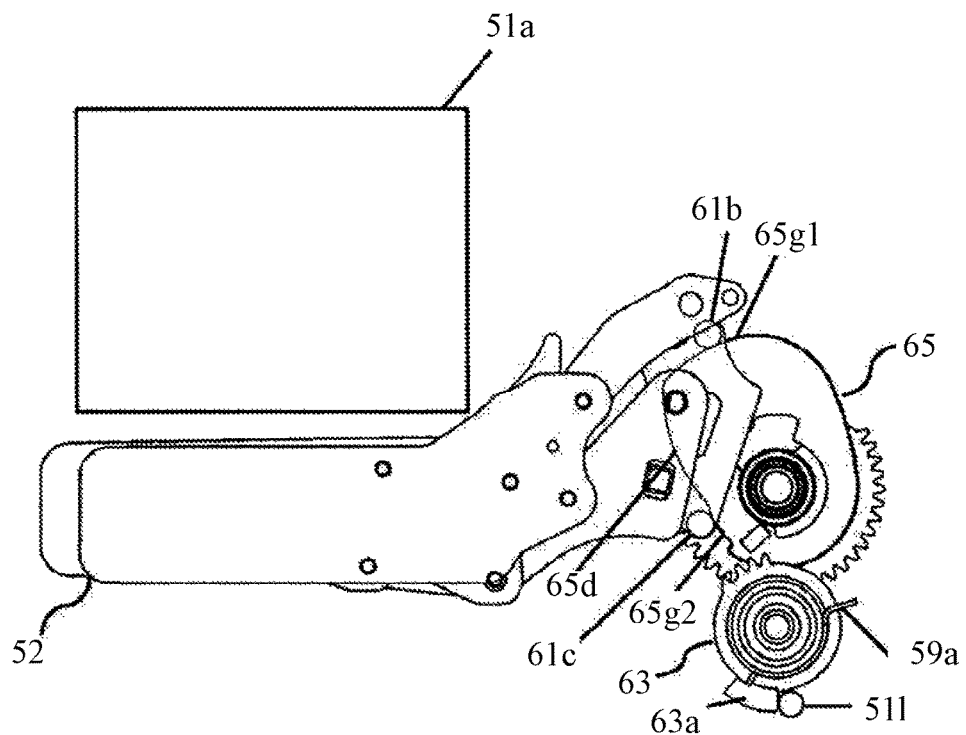
FIGS. 18A and 18B illustrate a blade running completion state in the shutter apparatus according to the second embodiment.
Figure 18B:
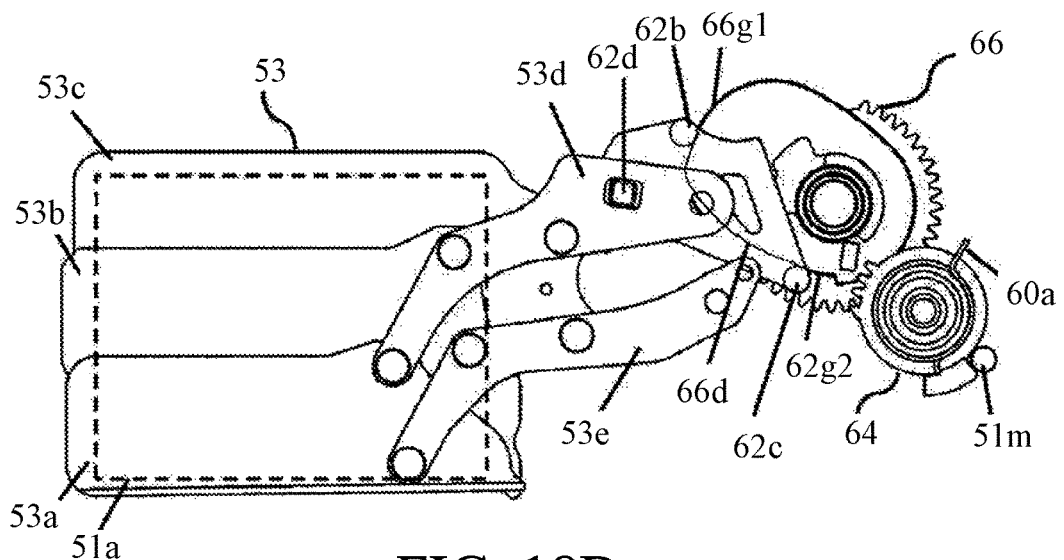

At this time, as illustrated in FIGS. 18A and 18B, the first blade unit 52 is folded, the second blade unit 53 is unfolded, and the aperture 51*a* is closed by the blades 53*a*, 53*b*, and 53*c*. Hence, after a predetermined time passes, the image capturing apparatus 400 can start still-image reading scanning from the image sensor 403.

<Blade Running Back—Spring Charge (Spring Lock Operation)>

After the standby in the state F for a predetermined time, the motors 69 and 70 drive the first cam gear 65 and the second cam gear 66 in the left rotating direction viewed from the object side. The second blade drive areas 65*d* and 66*d* contact the second cam engagement pins 61*c* and 62*c*, and drives the first drive member 61 and the second drive member 62 in the right rotating direction. Thereby, the first blade unit 52 is returned to the unfolded state and the second blade unit 53 is returned to the folded state, via the drive pins 61*d* and 62*d*. As the first cam gear 65 and the second cam gear 66 further rotate, the second gear parts 65*e* and 66*e* in the first cam gear 65 and the second cam gear 66 are connected to the gear parts 63*b* and 64*b* in the first assist gear 63 and the second assist gear 64. The first assist spring 59 and the second assist spring 60 are charged via the engagement parts 63*a* and 64*a*.

When the first cam gear 65 and the second cam gear 66 pass the state B illustrated in FIG. 4, the pressing cam surfaces 65*h* and 66*h* contact the second cam surfaces 63*c* and 64*c* in the first assist gear 63 and the second assist gear 64, as illustrated in FIGS. 15A and 15B. When the first cam gear 65 and the second cam gear 66 are further driven in the left rotating direction viewed from the object side, the assist holding cam surfaces 65*i* and 66*i* contact the cam surfaces 63*c* and 64*c*. When the first cam gear 65 and the second cam gear 66 pass the angles in the state A, movable ends 65*k* and 66*k* in the first cam gear 65 and the second cam gear 66 contact the contact parts 77*a* and 77*b* in the holder member 77, and the first cam gear 65 and the second cam gear 66 stop in the left rotating direction. At this time, the first assist gear 63 and the second assist gear 64 are forced by the first assist spring 59 and the second assist spring 60 in the left rotating direction viewed from the object side. However, the forces applied to the cam gears 65 and 66 are smaller than the frictional forces generated between the assist holding cam surfaces 65*i* and 66*i* and the cam surfaces 63*c* and 64*c*. Hence, the first cam gear 65 and the second cam gear 66 are never rotated by the forces from the first assist spring 59 and the second assist spring 60. Thus, the first cam gear 65 and the second cam gear 66 can be stopped by the cogging torques of the motors 69 and 70, and maintain the angles in the state A and stand by without electrifying the motors 69 and 70. In other words, the state is returned to the standby state illustrated in FIG. 14, and waits for the next release.

As described above, according to this embodiment, the transmission member (first assist gear 63 and second assist gear 64) has a first area (gear parts 63*b* and 64*b*) and a second area (cam surfaces 63*c* and 64*c*). The transmission member is connected to the cam member and transmits the force from the forcing member to the rotating direction of the cam member in the first area while the forcing member (the first assist spring 59 and the second assist spring 60) forces the cam member (the first cam gear 65 and the second cam gear 66). The transmission member is held by the cam member in the second area without transmitting the force from the forcing member to the rotating direction of the cam member. The assist holding cam surfaces 65*i* and 66*i* in the cam member mechanically holds the forcing member while charging the forcing member, via the transmission member. This configuration can restrain the power consumption amount in the standby state, and shorten the release time lag.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2017-001630, filed on Jan. 10, 2017, and 2017-224198, filed on Nov. 22, 2017, each of which is hereby incorporated by reference herein in its entirety.

What is claimed is:

1. A shutter apparatus comprising:
   a shutter base plate having an opening:
   a light shield movable between a closed state for closing the opening and an open state for opening the opening;
   a cam member rotatable in a first angle range, a second angle range, and a third angle range between the first angle range and the second angle range, the cam member that rotates in the third angle range rotating the light shield;
   a motor configured to drive the cam member;
   a forcing member configured to force the cam member so as to rotate the cam member from the first angle range to the third angle range; and
   a restricting member configured to restrict the forcing member from forcing the cam member in at least part of the first angle range,
   wherein in the first angle range, the restricting member is configured to transfer to a first state in which the restricting member is located on a locus of the forcing member and forced by the forcing member, a second state in which the restricting member retreats from the locus of the forcing member, and a third state in which the restricting member is located on the locus of the forcing member and is not forced by the forcing member, and
   wherein the restricting member is in the first state after charging of the forcing member by the cam member is completed.

2. The shutter apparatus according to claim 1, wherein the motor stops while the restricting member charges and restricts the forcing member from forcing the cam member in the at least part of the first angle range.

3. The shutter apparatus according to claim 1, wherein the cam member rotates without moving the light shield in the first angle range and second angle range, and
   wherein the cam member rotates in the third angle range so as to move the light shield.

4. The shutter apparatus according to claim 1, wherein the first angle range has a first partial area, a second partial area, and a third partial area,
   wherein the restricting member restricts the forcing member from forcing the cam member in the first partial area, and wherein the cam member is rotated in the second partial area by a driving force of the motor and a force from the forcing member which assists the cam member in rotating, and wherein the am member is rotated in the third partial area by the driving force of the motor without being forced by the forcing member.

5. The shutter apparatus according to claim 1, wherein the cam member has a projection, and wherein the restricting member is transferred from the first state or the third state to the second state, when the projection contacts and moves the restricting member in an optical axis direction.

6. The shutter apparatus according to claim 1, wherein the restricting member includes:

a first cam surface that contacts the cam member and transfers the first state to the second state;

a second cam surface that contacts the cam member and maintains the second state; and a third cam surface that contacts the cam member and transfers the third state to the second state.

7. The shutter apparatus according to claim 1, further comprising a drive member that includes a cam engagement pin, wherein the cam member is engaged with the cam engagement pin and is driven and rotated by the motor.

8. A shutter apparatus comprising:

a shutter base plate having an opening:

a light shield movable between a closed state for closing the opening and an open state for opening the opening;

a motor;

a drive member that includes a cam engagement pin and is rotatable in connection with the light shield;

a cam member engaged with the cam engagement pin and rotatable in a first angle range, a second angle range, and a third angle range between the first angle range and the second angle range;

a forcing member configured to force the cam member so as to rotate the cam member from the first angle range and the third angle range to the second angle range; and a transmission member connected to the cam member while the forcing member forces the cam member, the transmission member including a first area in which the transmission member transmits a force from the forcing member to a rotating direction of the cam member, and a second area in which the transmission member is held by the cam member without transmitting the force from the forcing member to the rotating direction of the cam member, wherein the first angle range is a range for moving the cam member without moving the light shield, the second angle range is a range for moving the cam member between the closed state and the open state of the light shield, and the third range is a range different from the first angle range and configured to move the cam member without moving the light shield.

9. An image capturing apparatus comprising a shutter apparatus and an image sensor configured to photoelectrically convert an optical image formed via an image capturing optical system, wherein a shutter apparatus includes:

a shutter base plate having an opening:

a light shield movable between a closed state for closing the opening and an open state for opening the opening;

a cam member rotatable in a first angle range, a second angle range, and a third angle range between the first angle range and the second angle range, the cam member that rotates in the third angle range rotating the light shield;

a motor configured to drive the cam member;

a forcing member configured to force the cam member so as to rotate the cam member from the first angle range to the third angle range; and a restricting member configured to restrict the forcing member from forcing the cam member in at least part of the first angle range, wherein in the first angle range, the restricting member is configured to transfer to a first state in which the restricting member is located on a locus of the forcing member and forced by the forcing member, a second state in which the restricting member retreats from the locus of the forcing member, and a third state in which the restricting member is located on the locus of the forcing member and is not forced by the forcing member, and wherein the restricting member is in the first state after charging of the forcing member by the cam member is completed.

10. The image capturing apparatus according to claim 9, wherein in an image capturing standby state, the restricting member charges and restricts the forcing member from forcing the cam member and the motor stops.

11. The image capturing apparatus according to claim 9, wherein in response to an image capturing start instruction from a photographer, the motor is driven so as to start rotating the cam member, and the restricting member releases a restriction of the forcing member as the motor drives.

12. An image capturing apparatus comprising a shutter apparatus and an image sensor configured to photoelectrically convert an optical image formed via an image capturing optical system, wherein a shutter apparatus includes:

a shutter base plate having an opening:

a light shield movable between a closed state for closing the opening and an open state for opening the opening;

a motor;

a drive member that includes a cam engagement pin and is rotatable in connection with the light shield;

a cam member engaged with the cam engagement pin and rotatable in a first angle range, a second angle range, and a third angle range between the first angle range and the second angle range;

a forcing member configured to force the cam member so as to rotate the cam member from the first angle range and the third angle range to the second angle range; and a transmission member connected to the cam member while the forcing member forces the cam member, the transmission member including a first area in which the transmission member transmits a force from the forcing member to a rotating direction of the cam member, and a second area in which the transmission member is held by the cam member without transmitting the force from the forcing member to the rotating direction of the cam member, wherein the first angle range is a range for moving the cam member without moving the light shield, the second angle range is a range for moving the cam member between the closed state and the open state of the light shield, and the third range is a range different from the first angle range and configured to move the cam member without moving the light shield.

* * * * *